(12) United States Patent
Wan et al.

(10) Patent No.: US 9,830,572 B2
(45) Date of Patent: *Nov. 28, 2017

(54) PICKUP LOCATIONS

(75) Inventors: Lin Wan, Bellevue, WA (US); Girish Lakshman, Sammamish, WA (US); Eric T. Ferguson, London (GB); Michael Mahesh Bhaskaran, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 525 days.

This patent is subject to a terminal disclaimer.

(21) Appl. No.: 13/434,824

(22) Filed: Mar. 29, 2012

(65) Prior Publication Data

US 2013/0262251 A1 Oct. 3, 2013

(51) Int. Cl.
*G06Q 10/08* (2012.01)

(52) U.S. Cl.
CPC ......... *G06Q 10/0836* (2013.01); *G06Q 10/08* (2013.01); *G06Q 10/087* (2013.01)

(58) Field of Classification Search
CPC ..... G06Q 30/00–30/08; G06Q 10/08–10/0875
USPC ................................................ 705/26.1–27.2
See application file for complete search history.

(56) References Cited

U.S. PATENT DOCUMENTS

| | | | |
|---|---|---|---|
| 4,865,248 A | 9/1989 | Barth | |
| 5,126,732 A | 6/1992 | Mardon | |
| 5,386,462 A | 1/1995 | Schlamp | |
| 5,586,686 A | 12/1996 | Bustos et al. | |
| 6,323,782 B1 | 11/2001 | Stephens et al. | |
| 6,344,796 B1 | 2/2002 | Ogilvie et al. | |
| 6,426,699 B1 | 7/2002 | Porter | |
| 6,439,345 B1 * | 8/2002 | Recktenwald | A47F 9/046 186/55 |
| 6,688,435 B1 | 2/2004 | Will et al. | |
| 6,690,997 B2 | 2/2004 | Rivalto | |
| 6,694,217 B2 | 2/2004 | Bloom | |
| 6,791,450 B2 | 9/2004 | Gokcebay et al. | |
| 6,866,195 B2 | 3/2005 | Knowles et al. | |

(Continued)

FOREIGN PATENT DOCUMENTS

| | | | |
|---|---|---|---|
| JP | 2001122438 A | 5/2001 | |
| JP | 2001225926 A | 8/2001 | |

(Continued)

OTHER PUBLICATIONS

"Planning just-in-time supply operations: A multiple-case analysis" Ferrin, Bruce Gary. The Pennsylvania State University, ProQuest Dissertations Publishing, 1991. 9214157.*

(Continued)

*Primary Examiner* — Michael Misiaszek
(74) *Attorney, Agent, or Firm* — Athorus, PLLC

(57) ABSTRACT

A pickup location that includes a control station and one or more storage compartment modules provides the ability for items to be ordered and delivered for pickup by a user without having to pack those items in a shipping package prior to shipping from a materials handling facility. Delivering items for pickup by a user without having to package the items prior to shipping, may provide a better experience for the customer, reduce waste in packaging material and a lower cost of delivering the ordered items to the customer.

23 Claims, 15 Drawing Sheets

(56) References Cited

U.S. PATENT DOCUMENTS

| | | | |
|---|---|---|---|
| 6,882,269 | B2 | 4/2005 | Moreno |
| 6,919,803 | B2 | 7/2005 | Breed |
| 6,961,711 | B1 * | 11/2005 | Chee .................. 705/26.1 |
| 6,970,838 | B1 * | 11/2005 | Kamath et al. ............ 705/26.4 |
| 6,974,928 | B2 | 12/2005 | Bloom |
| 7,068,149 | B2 | 6/2006 | Lee et al. |
| 7,129,817 | B2 | 10/2006 | Yamagishi |
| 7,133,743 | B2 | 11/2006 | Tilles et al. |
| 7,188,513 | B2 | 3/2007 | Wilson |
| 7,257,552 | B1 | 8/2007 | Franco |
| 7,337,686 | B2 | 3/2008 | Sagi-Dolev |
| 7,337,944 | B2 * | 3/2008 | Devar .............................. 232/19 |
| 7,558,743 | B2 | 7/2009 | Razumov |
| 7,653,457 | B2 | 1/2010 | Bloom |
| 7,661,591 | B2 * | 2/2010 | Dearing ............ G06K 7/10336 235/382 |
| 7,693,745 | B1 | 4/2010 | Pomerantz et al. |
| 7,925,375 | B2 | 4/2011 | Schininger et al. |
| 8,078,317 | B2 | 12/2011 | Allinson et al. |
| 8,145,351 | B2 | 3/2012 | Schininger et al. |
| 8,195,328 | B2 | 6/2012 | Mallett et al. |
| 8,196,482 | B2 | 6/2012 | Sagi-Dolev |
| 9,230,230 | B2 | 1/2016 | Gupta et al. |
| 2001/0045449 | A1 | 11/2001 | Shannon |
| 2002/0019759 | A1 | 2/2002 | Arunapuram et al. |
| 2002/0116289 | A1 | 8/2002 | Yang |
| 2002/0130065 | A1 | 9/2002 | Bloom |
| 2002/0147981 | A1 | 10/2002 | Ohta et al. |
| 2002/0177922 | A1 | 11/2002 | Bloom |
| 2003/0040980 | A1 | 2/2003 | Nakajima et al. |
| 2003/0050732 | A1 | 3/2003 | Rivalto |
| 2004/0021551 | A1 | 2/2004 | Yamagishi |
| 2005/0104716 | A1 | 5/2005 | Simms et al. |
| 2007/0073552 | A1 | 3/2007 | Hileman |
| 2007/0133980 | A1 | 6/2007 | Meyers et al. |
| 2007/0170237 | A1 | 7/2007 | Neff |
| 2007/0192191 | A1 | 8/2007 | Neal et al. |
| 2007/0299686 | A1 | 12/2007 | Hu et al. |
| 2008/0128444 | A1 | 6/2008 | Schininger et al. |
| 2009/0063166 | A1 | 3/2009 | Palmer |
| 2009/0106124 | A1 | 4/2009 | Yang |
| 2009/0187489 | A1 | 7/2009 | Mallick et al. |
| 2009/0201198 | A1 | 8/2009 | Moudy |
| 2010/0057871 | A1 | 3/2010 | Kaplan et al. |
| 2010/0241467 | A1 | 9/2010 | Saw et al. |
| 2012/0039694 | A1 | 2/2012 | Suzanne |
| 2012/0109419 | A1 | 5/2012 | Mercado |
| 2013/0144428 | A1 | 6/2013 | Irwin et al. |
| 2013/0261792 | A1 | 10/2013 | Gupta et al. |
| 2013/0262251 | A1 | 10/2013 | Wan et al. |
| 2013/0262276 | A1 | 10/2013 | Wan et al. |
| 2013/0262336 | A1 | 10/2013 | Wan et al. |
| 2014/0052661 | A1 | 2/2014 | Shakes et al. |

FOREIGN PATENT DOCUMENTS

| | | | |
|---|---|---|---|
| JP | 2002279314 | A | 9/2002 |
| JP | 2003058790 | | 2/2003 |
| JP | 2004059164 | A | 2/2004 |
| JP | 2006106920 | A | 4/2006 |
| JP | 2007233884 | A | 9/2007 |
| JP | 2007290803 | A | 11/2007 |
| JP | 2007537546 | | 12/2007 |
| JP | 2011505644 | | 2/2011 |
| RU | 97552 | U1 | 9/2010 |
| WO | 03023688 | A2 | 3/2003 |
| WO | 2006065945 | A2 | 6/2006 |
| WO | 2006083268 | A1 | 8/2006 |
| WO | 2009073338 | A2 | 6/2009 |
| WO | 2010090549 | A2 | 8/2010 |

OTHER PUBLICATIONS

"Focus on: Automated Storage" Anonymous. Modern Materials Handling, [Warehousing Management Edition]; Framingham 65.11 (Nov. 2010): 36-38,40-41.*

PCT International Search Report & Written Opinion for Application No. PCT/US2013/030087 (corresponding to U.S. Appl. No. 13/434,824, U.S. Appl. No. 13/434,844, U.S. Appl. No. 13/434,839, and U.S. Appl. No. 13/434,834), mailed on May 14, 2013, 9 pages.

US Patent Application entitled "Pre-Order Delivery of Items to a Pickup Location", First named inventor: Wan, Lin; Filed Mar. 14, 2013; U.S. Appl. No. 13/826,853.

Non-Final Office Action dated Feb. 27, 2013 from U.S. Appl. No. 13/434,839, 14 pages.

US Patent Application entitled, "System and Method for Generating Predictions for Unit Allocation in a Materials Processing Network"; First named inventor: Shaikh, Qaseem Ahmed; Filed: Mar. 5, 2009; U.S. Appl. No. 12/398,602.

EP Search Report for Application No. EP13769409 dated Oct. 19, 2015.

Mexican Office Action for Application No. MX/a/2014/011692 dated Feb. 24, 2016.

Russian Office Action for Application No. 2014143482 dated Mar. 16, 2016.

United Parcel Service, UPS: Packing Irregularly Shaped items, Jul. 21, 2008, pp. 2-4.

International Search Report of International Application No. PCT/US2015/015283 dated May 13, 2015.

JP H07-093660 A1.

JP Unexamined Utility Model Publication No. H03-050802 U.

JP Utility Model Registration No. 3027199 U.

Office Action for Japanese Patent Application No. 2015-231336 dated Jan. 30, 2017.

Notice of Allowance for Japanese Patent Application No. 2015-501716 dated Nov. 1, 2015.

* cited by examiner

US 9,830,572 B2

PICKUP LOCATIONS

BACKGROUND

Many companies package items and/or groups of items together for a variety of purposes, such as e-commerce and mail-order companies that package items (e.g., books, CDs, apparel, food, etc.) to be shipped to fulfill orders from users. Retailers, wholesalers, and other product distributors (which may collectively be referred to as distributors) typically maintain an inventory of various items that may be ordered by clients or users. This inventory may be maintained and processed at a materials handling facility which may include, but is not limited to, one or more of: warehouses, distribution centers, cross-docking facilities, order fulfillment facilities, packaging facilities, shipping facilities, or other facilities or combinations of facilities for performing one or more functions of material (inventory) handling.

Currently, items must be placed in shipping packages (e.g., corrugated boxes) and shipped to the user. Shipping packages are typically necessary to protect the items from damage during shipping. As part of the operation of packing items in a shipping package, an agent may select from a limited number of available shipping packages based on a visual assessment of the item or items once they are picked from inventory and/or grouped. This visual method of selecting shipping packages may be prone to human error, as an agent may select a shipping package that is too small, larger than needed to handle the item or items, or that does not adequately protect the contents of the shipping package. This may result in higher costs associated with using an inappropriate shipping package or result in additional costs associated with re-work—in the case that an agent must re-package the item(s) or use multiple shipping packages. Shipping an item or a group of items in a shipping package that is larger than necessary may result in unnecessary fulfillment costs. Shipping an item or group of items in a shipping package also results in the customer receiving, not only the ordered items but the shipping package that contained the items and the dunnage added to secure the items.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
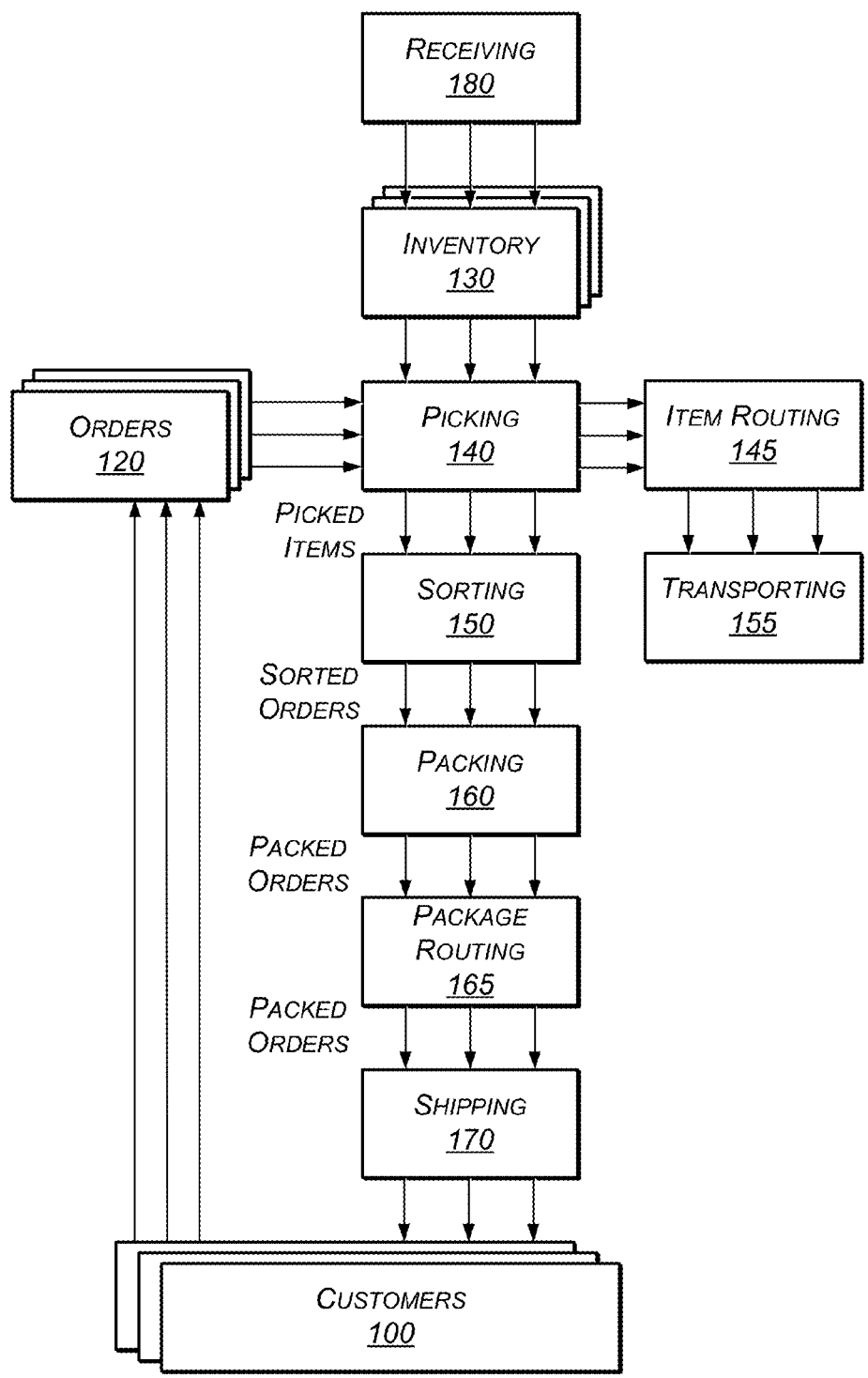
FIG. 1 illustrates a broad view of the operation of a materials handling facility, in one implementation.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

This disclosure describes, in part, an environment that includes a pickup location that allows the delivery of items to customers without the need to pack the items in shipping packages prior to shipping. For example, a customer may order an item via an e-commerce website and designate a pickup location as the delivery destination. The ordered item may be picked from a materials handling facility, transported to the pickup location, placed in a secure storage compartment, and made available for pickup by the customer, all without having to pack the item in a shipping package prior to transport from the materials handling facility. In such an example, when the item is placed in a storage compartment at the designated pickup location, the customer may receive a message identifying that the ordered item is available for pickup. When the customer arrives at the pickup location, they may enter a code included on the message, or otherwise identify themselves, and the secure storage compartment is opened such that the item may be retrieved by the customer and the order completed.

Not only does this process reduce the need for packing items in shipping packages, thereby saving costs in shipping and providing a better customer experience, more items can typically be transported in a transportation unit (e.g., truck). For example, a typical transportation unit can conventionally carry between 3,000-8,000 shipping packages of items, which represents between approximately 5,100-13,600 items. In comparison, transporting items in delivery containers without packing those items in shipping packages, results in the same transportation unit being able to transport between approximately 25,000-35,000 items.

In addition to enabling delivery of items to customers without the need to pack the items in a shipping package prior to shipping, pickup locations, also referred to herein an automated pickup locations, may be used as an automated transfer point for drop-off and pickup of items that are scheduled for delivery directly to a customer (e.g., delivery to a home or office location) within a pre-defined geographic vicinity of the pickup location. For example, there may be fifty orders that are to be delivered to homes within a five mile radius of the pickup location. Rather than using normal or traditional delivery methods (e.g., US Post Office, Federal Express, UPS) to ship the orders from a materials handling facility to the customer, those orders may be transferred to the pickup location and securely stored in one or more storage compartments. After the orders have been transferred to the pickup location and stored, a carrier (e.g. local carrier, bike messenger) designated to perform final delivery of those fifty orders may arrive at the pickup location, retrieve the orders from the secure storage compartment(s), and complete delivery to the customer's homes.

In another example, pickup locations may be used to store and deliver high-volume and/or release day items. A high-volume item may be, for example, an item that is frequently ordered, such as a popular book, shoe, video game, etc. A release day item may be an item that will become available on the day it released to the general public (e.g., book, movie, game, toy). For high-volume and/or release day items, they may be transported to and stored in storage compartments of various pickup locations so they are immediately available to customers or available for pickup on the release. As discussed further below, high-volume items may be transported to various pickup locations and placed in storage compartments at those pickup locations before a customer has ordered the item. When a customer orders the item, a storage compartment containing one of those items may be associated with the customer's order and the item made immediately available for retrieval by the customer.

In a similar manner, release day items may be transported to and placed in storage compartments of various pickup locations prior to release of the items. Orders, even before release, may be placed and associated with storage compartments containing the release day items and the customer may be messaged that the ordered item will be available for immediate pickup on the release day. When release day for an item arrives, the item becomes available for retrieval by the customer at the pickup location.

In yet another example, a pickup location may be used as temporary storage for items to be delivered directly to an individual. For example, if a carrier was unable to deliver an item requiring customer signature, the item may be stored in a nearby pickup location. In such an example, rather than leaving a message that a delivery was attempted and that it will be re-delivered the next day, the customer may receive a message that delivery was attempted, re-delivery will be attempted the next day, or the customer may retrieve the item from the pickup location before re-delivery. In this example, or in other instances where an order was originally scheduled for direct delivery to the customer (e.g., customer's home), the customer may modify the delivery destination to be the pickup location.

A block diagram of a materials handling facility, which, in one implementation, may be an order fulfillment facility configured to utilize various systems and methods described herein, is illustrated in FIG. 1. In this example, multiple customers 100 may submit orders 120, where each order 120 specifies one or more items from inventory 130 to be shipped to the customer or to another entity specified in the order. An order fulfillment facility typically includes a receiving operation 180 for receiving shipments of stock from various vendors and storing the received stock in inventory 130. To fulfill the orders 120, the item(s) specified in each order may be retrieved or "picked" from inventory 130 (which may also be referred to as stock storage) in the order fulfillment facility, as indicated by picking operation 140. In some implementations, the items of a customer order may be divided into multiple shipment sets for fulfillment by a planning service before fulfillment instructions are generated (not shown). As used herein, the term "shipment set" may refer to a single item of a customer's order, multiple items of a customer's order, or all items of a customer's order.

In some instances, when a customer has selected a pickup location, such as the pickup location described below with respect to FIG. 2, as the delivery destination, the item(s) of one or more shipment sets may be picked at the picking operation 140 directly into delivery containers. A "delivery container," as used herein, may be any form of container used in transporting or handling items. For example, a delivery container may be a tote, pallet, bin, trailer, etc. Additionally, the delivery container may be segmented or otherwise include division points, permanent or movable, that enable separation of items within the delivery container. In some instances, items themselves, such as larger items (e.g., big screen televisions, desks, cabinets) may be considered and treated as delivery containers. The delivery container may also include a unique identifier, such as a bar code, QR code, unique number, etc. to enable tracking and identification of the delivery container and association of items placed in the delivery container. For example, during a picking operation, an agent within the materials handling facility may scan the bar code of the delivery container and scan a barcode or identifier of the picked item as the item is placed into the delivery container. Scanning of the delivery container and the picked item results in the item becoming associated with and tracked with the delivery container. In some implementations, for delivery containers that are segmented or otherwise include division points, those segments may each include a unique identifier (e.g., bar code) and as items are place in the delivery container they may be associated with a specific location, or segment within the delivery container by scanning the identifier of that segment. Likewise, because items may not be packed in shipping packages, the packing slip typically included in a shipping package may be applied to the item (e.g., stickered to the item), printed out at the pickup location upon retrieval of the item, or otherwise made available to a user.

Regardless of the type of delivery container utilized, in some implementations, items for which a pickup location has been selected as the final delivery destination do not need to be packed in a shipping package and can be transported to the pickup location in the delivery container. In other instances, items that are pre-packaged or fragile items that need additional protection prior to transport may be picked and transported to a pickup location in a delivery container. In another implementation, items may be put in bags prior to placement in the delivery container and/or storage compartment to provide confidentiality of the ordered items. In addition, items from multiple shipment sets destined for the same pickup location may be picked into the same delivery container for transport. As delivery containers are filled, an item routing operation 145 may route the filled delivery containers to the appropriate transporting operation 155 for transport to the designated pickup location. The item routing operation 145 may be manual or automated. The item routing operation 145 may receive an indication of the pickup location in which each item should be routed from a shipment planning system and route delivery containers to one of two or more transporting operations 170, from which they may be transported to the pickup location.

While in most instances described herein, a delivery container is transported to the pickup location in which the items contained therein will be made available for pickup by a customer, in some instances the delivery container may be transported to an initial pickup location for transfer by another carrier to a final pickup location where the items will be made available to a customer for retrieval. In such instances, the delivery container will be treated as a transfer container, discussed below, while in transit to first pickup location and when transported from the first pickup location to the final pickup location it will be considered a delivery container and received as a delivery container at the final pickup location, utilizing the example processes discussed below.

Items of a shipment set may be picked into different delivery containers. When items of a shipment set are not all picked into the same delivery container, as described in further detail below, they may be transported to the pickup location separately and merged/sorted into a common storage compartment for customer retrieval at the pickup location. A delivery container does not necessarily include all of the items ordered by the customer or all of the items of a shipment set; a delivery container may include only a subset of the items of a shipment set.

In other examples, for items not scheduled for delivery to a pickup location, picked items may be delivered to one or more stations in the order fulfillment facility for sorting 150 into their respective shipment sets and for packing 160 in shipping packages. A package routing operation 165 may sort orders packing in shipping packages for routing to one of two or more shipping operations 170, from which they may be shipped to the customers 100. The package routing operation 165 may in various implementations be automated or manual. The package routing operation 165 may receive an indication of the destination to which each packed shipment set should be routed from a central control system. In some instances, the destination may the final destination identified by the customer or a pickup location at which transfer of a shipment set may occur for final delivery to the customer. The package routing operation 165 may also determine a routing destination for each packed shipment set dependent on the size of a shipping package in which the shipment set is contained and/or based on whether the shipment set will be delivered directly to the customer or be delivered to a pickup location at which transfer of the shipment set will occur for final delivery to the customer.

In some instances, rather than packing shipment sets in a shipping package for final delivery to a customer, the items of one or more shipment sets may be picked directly into a transfer container. A "transfer container," like a delivery container, may be any form of container used in transporting or handling items. For example, a transfer container may be a tote, pallet, bin, trailer, etc. Additionally, the transfer container may be segmented or otherwise include division points, permanent or movable, that enable separation of items within the transfer container. In some instances, items themselves, such as larger items (e.g., big screen televisions, desks, cabinets) may be considered and treated as transfer containers. The transfer container may also include a unique identifier, such as a bar code, QR code, unique number, etc. to enable tracking and identification of the transfer container and association of items placed in the transfer container. For example, during a picking operation, an agent within the materials handling facility may scan the bar code of the transfer container and scan a barcode or identifier of the picked item as the item is placed into the transfer container. Scanning of the transfer container and the picked item results in the item becoming associated with and tracked with the transfer container. In some implementations, for transfer containers that are segmented or otherwise include division points, those segments may each include a unique identifier (e.g., bar code) and as items are place in the transfer container they may be associated with a specific location, or segment within the transfer container by scanning the identifier of that segment. It will be appreciated, that while delivery containers and transfer containers are discussed as separate types of containers, such a distinction is made for ease of explanation and is not intended to be limiting. A delivery container and a transfer container may be the same type of container, or the same container used in different processes described herein.

In some implementations, the routing operation may route the picked or sorted items to a particular packing station 160 depending upon the size or type of the shipping package into which the items are to be packaged. For example, not all shipping packages utilized in the facility may be available at all of the packing stations 160. Similarly, some packing stations 160 may not have access to protective materials recommended for shipping fragile items or items for which additional protection may be appropriate. Therefore, if an item (or at least one item in a group of items to be shipped together) requires special packaging, a routing operation may be configured to direct the item(s) to a packing station 160 at which an appropriate shipping package and/or protective materials are available. Likewise, if a fragile item is designated for picking into a delivery container or transfer container, it may be routed to a packing station (not shown) at which appropriate protective material or packaging is available to allow for proper handling of the item(s).

Note that not every fulfillment facility may include both sorting and packing stations. In certain implementations, agents may transfer picked items directly to a packing station, such as packing station 160, while in other implementations, agents may transfer picked items to a combination sorting and packing stations (not illustrated). This may result in a stream and/or batches of picked items for multiple incomplete or complete shipment sets being delivered to a sorting station for sorting 150 into their respective shipment sets for packing and shipping, according to one implementation.

Portions of a shipment set may be received at different times, or time intervals. When portions of a shipment set do not arrive during the same time interval, sorting 150 and packing 160 may have to wait for one or more items of some shipment sets to be delivered to the sorting station(s) before processing of the shipment set can be completed. Note that a picked, packed and shipped shipment set does not necessarily include all of the items ordered by the customer; a shipped shipment set may include only a subset of the ordered items available to ship at one time from one materials handling facility. Also note that the various operations of a materials handling facility may be located in one building or facility, or alternatively may be spread or subdivided across two or more buildings or facilities.

The arrangement and order of operations illustrated by FIG. 1 is merely one example of many possible implementations of the operation of a materials handling facility, such as an order fulfillment facility, that enables transport of items directly to pickup locations without packing the items. Other types of materials handling, manufacturing, or order fulfillment facilities may include different, fewer, or additional operations and resources, according to different implementations.

Figure 2:
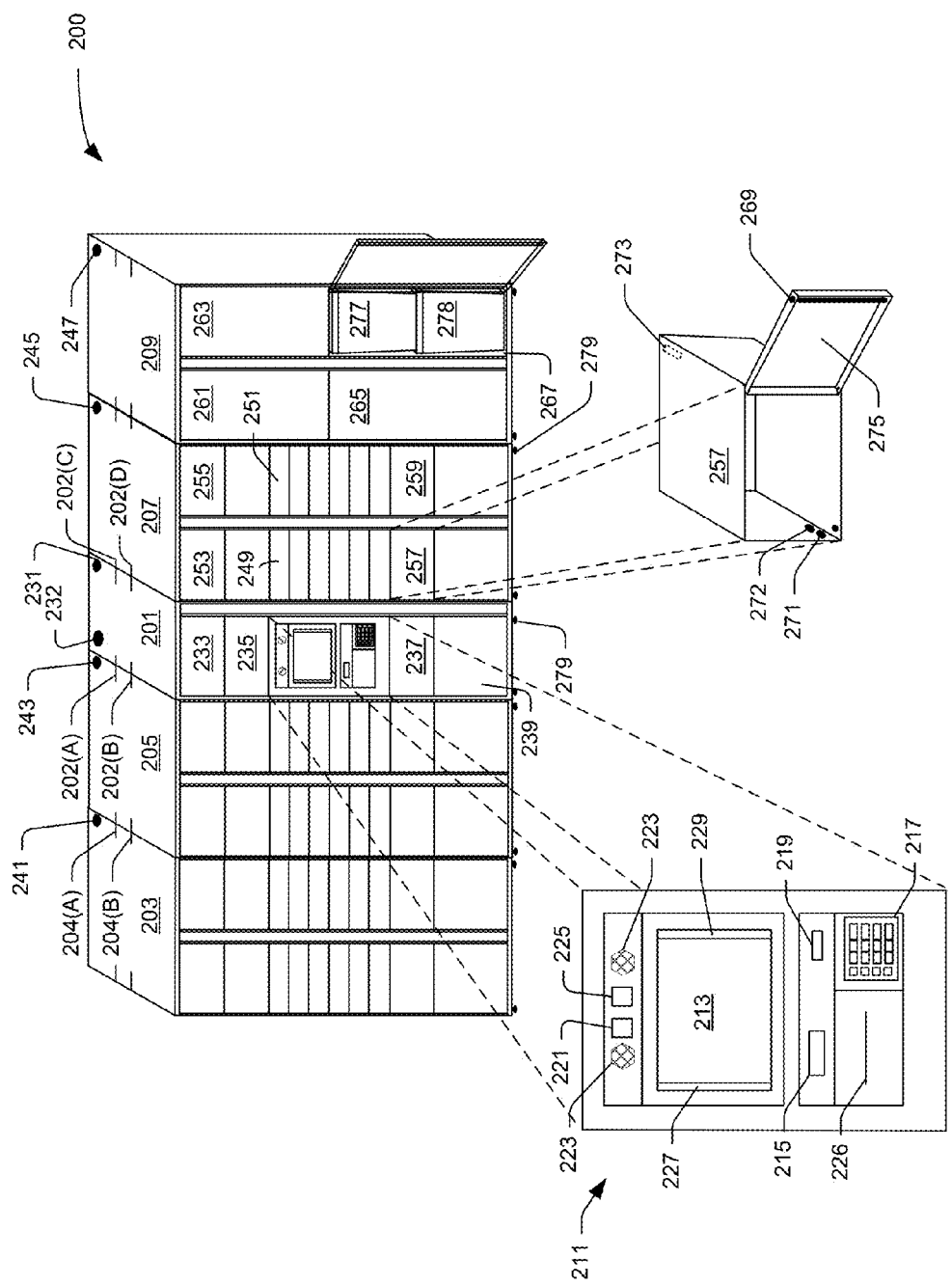
FIG. 2 depicts a block diagram of a pickup location, in one implementation.

FIG. 2 depicts a block diagram of a pickup location 200, in one implementation. The pickup location 200 may include one or more control stations 201 and one or more storage compartment modules 203, 205, 207, 209. The control station 201 acts as the central control point for the pickup location 200, providing power, computing resources, user input and network access to the pickup location 200. For example, control station 201 may include an internal computing system (not shown), such as a computing system described below with respect to FIG. 15, or other computing system, that is capable of maintaining state information for each storage compartment at the pickup location 200 and providing other computing functions. For example, the internal computing system may include a command component that maintains information as to which storage compartments of the pickup location 200 are empty, which storage compartments include items, the access code(s) or other identifier(s) necessary to open each of the storage compartments and any other information necessary to maintain the pickup location. The command component may also issue commands or instructions to the storage compartment modules to lock/unlock storage compartments, active sensors, and the like. The pickup location 200 may be configured to obtain information from a remote computing resource, shipment planning system, capacity planning system or material handling facility or may be configured to operate primarily as a stand-alone unit, with limited external communication to provide capacity information and/or to receive/provide order/delivery/transfer information.

The control station 201 may also include a user interface 211. The user interface 211 is configured to receive and provide information to one or more users of the pickup location 200 and may include, but is not limited to, a display 213, such as a touch-screen display, a scanner 215, a keypad 217, a biometric scanner 219, an audio transducer 221, one or more speakers 223, one or more image capture devices 225, such as a video camera, and any other types of input or output devices that may support interaction between the pickup location 200 and one or more users. For example, the user interface 211 may also include a credit card reader, the ability to accept money (such as cash or coins) and/or the ability to vend items (e.g., stamps, labels, envelopes, shipping packages) using a vending slot 226. Providing the ability for the pickup location 200 to accept credit cards and/or money enables the delivery of orders to a storage compartment at the pickup location 200 for which the items are paid for at the time of pickup (e.g. cash on delivery). Likewise enabling vending of items, such as stamps or envelopes, supports the ability for users to utilize a pickup location to ship or deliver goods, as described in more detail below.

In addition to including user input and output devices, the user interface 211 may also include the ability to collect particulates, such as for use in detection of hazardous (e.g., explosives) or banned substances (e.g. drugs). In one implementation, the user interface 211 may include a particulate sensor that includes a forced air ejection component 227 and an air intake component 229. The air ejection component expels air from a left side of the display 213 while a user is interacting with or otherwise within a predetermined range of the display 213. Opposite the air ejection component 227, the air intake component 229 collects the ejected air and any particulates that are collected as the air passes over the display 213 and past the user's hand or fingers as they interact with the display 213. Collected particulates may be scanned or otherwise processed to determine if potentially hazardous or banned substances may be placed in a storage compartment using any known particulate testing technique. If particulates indicating the potential presence of hazardous or banned substances are detected, the control station 201 may determine to not open a storage compartment door, may alert the authorities, or take other protective actions (such as shutting down the pickup location or performing additional tests).

The control station 201 may also include a connector component configured to provide wired and/or wireless network connectivity with the other storage compartment modules 203, 205, 207, 209, as well as to remote computing devices (not shown) or materials handling facilities. Wireless connectivity may be implemented using a wireless antenna 231, which may provide both receive and transmit functionality. Power and/or network communication with remote computing devices may be obtained from a main access point 232. In addition, in some implementations, the control station 201 may include one or more storage compartments 233, 235, 237, 239. As described in more detail below with respect to the storage compartment modules 203, 205, 207, 209, the storage compartments 233, 235, 237, 239 of the control station 201 may be of any size or configuration. As with each of the other storage compartments, the storage compartments 233, 235, 237, 239 of the control station 201 may include an automated locking mechanism, image capture device, a motion or presence detection mechanism, etc. Alternatively, in some implementations one or more of the storage compartments may be utilized as an additional user interface. For example, storage compartment 239 may be removed and the space remaining may be utilized to provide a scale or other type of weight determination component to allow customers to weigh items for shipment, determine the cost necessary to ship the item, and pay for shipping using the user interface 211.

The control station 201 may include one or more connector components 202(A), 202(B), 202(C), 202(D) to which a storage compartment module, such as storage compartment module 205 or storage compartment module 207 may connect with the control station 201. For example, connector component 202(A) may provide power to storage compartment module 205, connector component 202(B) may provide communication with storage compartment module 205, connector component 202(C) may provide power to storage compartment module 207 and connector component 202(D) may provide communication with storage compartment module 207. Likewise, the storage compartment modules may also include one or more connector component, such as connector component 204(A), 204(B) to provide power and connectivity to additional storage compartment modules, such as storage compartment module 203.

Each storage compartment module, such as storage compartment modules 203, 205, 207, 209, may be configured so the pickup location 200 is modular, such that one or more storage compartment modules can be easily removed or added to the control station 201 of the pickup location 200. The ability to add or remove storage compartment modules at a pickup location 200 supports the ability to easily and quickly expand or remove capacity so that the demand for that pickup location can be satisfied. For example, during the Christmas holiday season, additional storage compartment modules may need to be added to the pickup location 200 to support the increased demand of items ordered by customers. As storage compartment modules 203, 205, 207, 209 are added or removed from a pickup location 200, the control station 201 informs the warehouse management system and/or a capacity planning system of the added or removed capacity.

Each storage compartment module 203, 205, 207, 209 includes one or more storage compartments, one or more receptor components for connecting with connector components of a control station 201 (or another storage compartment module) and one or more connector components for allowing other storage compartment modules to connect thereto, thereby providing power and/or connectivity with the control station 201. The storage compartments of each storage compartment module may be of varying sizes and number. As such, storage compartment modules with different storage compartment sizes can be added to a pickup location 200 to optimize the storage compartment configuration to match that of the sizes of orders typically scheduled for delivery to the pickup location.

Figure 15:
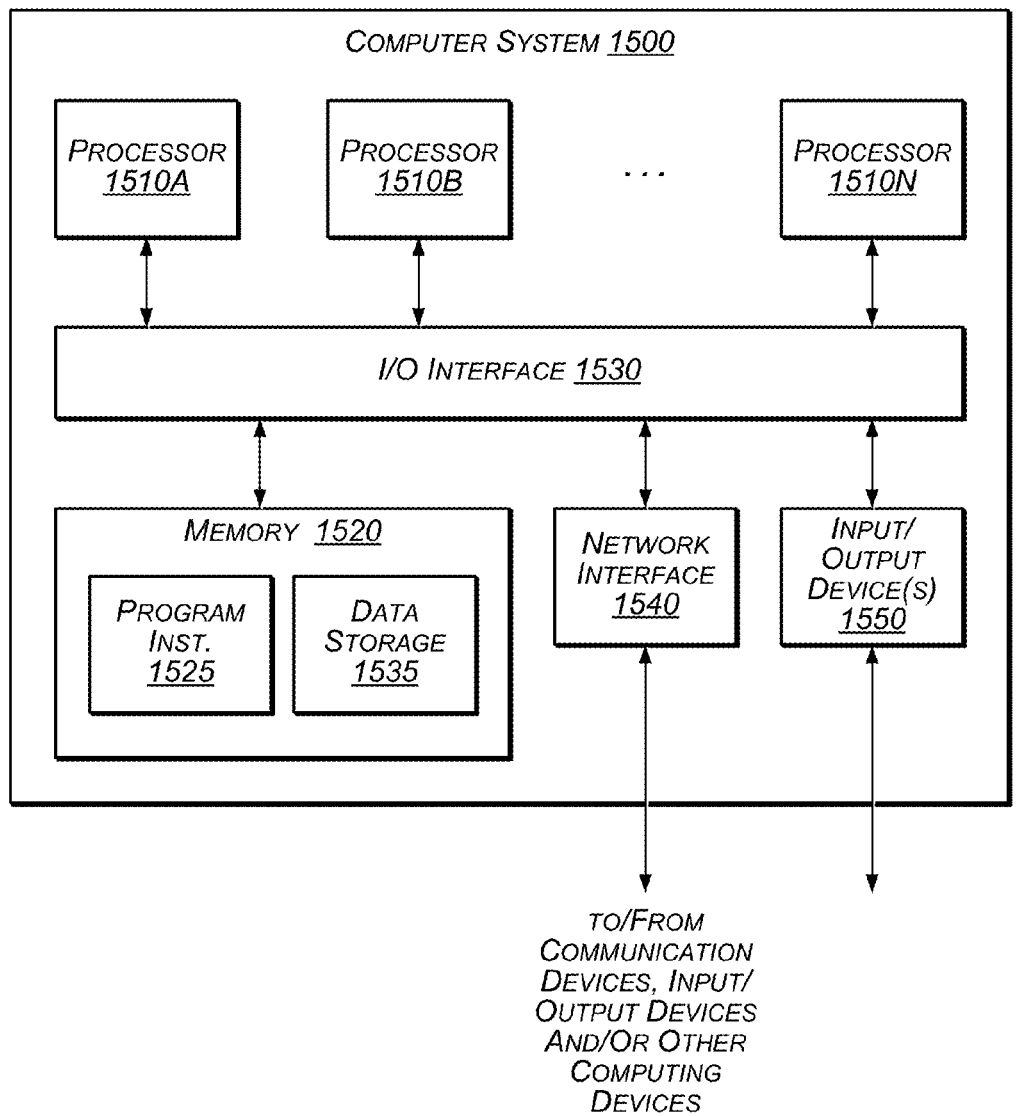
FIG. 15 is a block diagram illustrating an example computer system configured to implement one or more of the pickup location operations or operations performed at a pickup location, as described herein.

In addition to including storage compartments, power and connectivity points, the storage compartment modules 203, 205, 207, 209 may also include one or more wireless antennas 241, 243, 245, 247 and one or more computing systems, such as the computing system described with respect to FIG. 15, or a simpler computing system such as a printed circuit board, RFID tag, or anything else that may be detectable by the control station 201 and used to identify the storage compartment module. The computing component(s) of each storage compartment module may include a unique identifier of the storage compartment module and configuration information of the storage compartment module, which includes dimension information and location information of each storage compartment of the storage compartment module. The computing component may also include a storage compartment management component configured to control the actuators that enable locking and unlocking of the storage compartment doors of the storage compartment module 203, 205, 207, 209 in response to receiving commands or instructions from a command component of the control station 201.

A storage compartment module, such as storage compartment module 207, when added to a control station 201 and power is applied, provides information to the control station 201 identifying the storage compartment module 207, the number, location, and dimensions of each storage compartment of the storage compartment module and any other configuration or information necessary to enable the control station 201 to control the storage compartment module 207. As illustrated by the comparison between storage compartment module 207 and storage compartment module 209, each storage compartment module may have a variety of different configurations, sizes and numbers of storage compartments. For example, storage compartment module 207 includes a group of small storage compartments, such as small storage compartments 249, 251, a group of medium-sized storage compartments, such as medium-sized storage compartments 253, 255 and a group of larger storage compartments, such as larger storage compartments 257, 259. In contrast, storage compartment module 209 includes four very large storage compartments 261, 263, 265, 267. It will be appreciated that any number, size and configuration of storage compartments of a storage compartment module may be utilized with the various implementations described herein.

In an alternative implementation, rather than providing all of the information from the storage compartment module to the control station 201, the storage compartment module 207 may only provide limited information, such an identifier, to the control station 201. The control station 201, upon receiving the limited information from an added storage compartment module 207, may make a request to a remote computing system, such as a capacity planning system, and obtain information about the configuration, number and sizes of the storage compartments of the added storage compartment module 207.

The control station 201, upon receiving identifying information of an added storage compartment module 207, may allocate the added capacity to the pickup location 200, inform a remote computing resource, such as a warehouse management system or capacity planning system of the added capacity, and take control of the operation of the added storage compartment module. As such, the added storage compartment module may act as a slave component for the control station, receiving instructions (e.g., open storage compartment, close storage compartment, activate image capture device, monitor motion sensor) from the command component of the control station 201 and providing responses (e.g., closed-door closed, open-door, object/movement detected) to the control station 201 via the storage compartment management component.

Each storage compartment of a storage compartment module 203, 205, 207, 209 or control station 201 includes an upper, bottom, side and rear surfaces and at least one door configured to form a cavity in which items may be stored. In addition, each storage compartment may include various security or other components. For example, looking at the expanded view of storage compartment 257, disposed within the cavity the storage compartment may include a locking mechanism 269, which may be controlled remotely by the command component of the control station 201 via the storage compartment management component, a presence detection sensor 271, motion sensor 272, an image capture device 273, and a mirror (or other reflective surface) on the top inside of the storage compartment unit (not shown). The locking mechanism 269 may be controlled by the control station 201, either through wired or wireless communication with the storage compartment management component, to effect locking and unlocking of the door 275 of the storage compartment 257. For example, when a user interacts with the control station 201 via the display 213 and provides an access code or other identifier, the control station 201 may identify a specific storage compartment associated with the access code or other identifier and the command component may wirelessly send instructions to the storage compartment management component of the storage compartment module 207 to unlock a storage compartment 257. The instructions may include a command (e.g., unlock), an address or identifier of the specific storage compartment and any other information necessary for communication between the control station 201 and the storage compartment module 207. In response to receiving the instructions from the command component, the storage compartment management component of the storage compartment module 207 may activate a locking mechanism that moves the pins of the locking mechanism 269 on the door 275 of the identified storage compartment 257 such that the pins retract, thereby disengaging the lock of the storage compartment 257 allowing the door 275 to open. In some implementations, the storage compartment 257 may also include a spring mechanism (not shown) such that when the locking mechanism 269 of the storage compartment 257 is disengaged, the spring mechanism propels the door 275 outward, thereby identifying to a user that the door 275 is unlocked and the storage compartment 257 is accessible.

While the locking mechanism described above utilizes retractable pins, any mechanical, magnetic, electrical or other form of locking mechanism may be utilized with the various implements described herein. In addition, the storage compartment 257 may also include magnets to help retrieve and close a door when it is not all the way closed. Also, the locking mechanism of different storage compartments and different storage compartment modules may be the same or different. Moreover, while the above example describes sending instructions from the command component of the control station 201 to the storage compartment management component of the storage compartment module, in other implements, each storage compartment may be controlled and/or communicated with directly by the control station 201 and/or the command component.

The presence detection sensor 271 may be used to detect the presence or absence of objects in the storage compartment 257. For example, the presence detection sensor 271 may be utilized when a carrier is placing items, delivery containers and/or transfer containers in the storage compartment 257 to confirm that the item is indeed in the storage compartment 257 before the door 275 is closed and locked by the locking mechanism 269. Additionally, the presence sensor 271 and/or motion sensor 272 may be used when a customer is picking up an order stored in the storage compartment 257 or when a carrier is removing items, delivery containers and/or transfer containers from the storage compartment 257. For example, when a customer interacts with the control station 201 via the touch control display 213 and provides an access code such that a storage compartment 257 is opened, the presence detection sensor 271 and/or motion sensor 272 may be used to confirm that a customer has reached into the storage compartment 257 and removed its contents (or added items in the case of returns or shipping), prior to allowing the storage compartment door 275 to be closed and locked with the locking mechanism 269. In some implementations, there may be multiple presence detection sensors 271 and/or motion sensors 272 distributed throughout the inside of a storage compartment to ensure objects/motion is detected. In still another implementation, the bottom of the storage compartment may include protrusions or rises to position thin items so they are detected by the presence detection sensor 271.

The storage compartments, such as storage compartment 257, may also include an image capture device 273, such as a camera, and optionally an illumination component (not shown), such as a light emitting diode (LED), that may be used to illuminate the inside of the storage compartment 257. The image capture device 273 may also be used to the detect presence or absence of items within the storage compartment 257, detect the item itself, for example to simplify returns, as well as for security. For example, the image capture device 273 may be used to identify the type of object located within the storage compartment 257 and/or to identify or record video/images of access with the storage compartment 257. In addition, the image capture device 273 may be used to determine the amount of space available in the storage compartment 257. For example, an image taken by the image capture device 273 may be transmitted via wired or wireless communication to the control station 201 and the control station 201 may determine the amount of space available in the storage compartment 257. Such information may be used to determine if all items of a shipment set will fit in a single storage compartment 257, if all items associated with the shipment set are present in the storage compartment, or if the shipment set needs to be divided across multiple storage compartments. In addition, the image capture device 273 may also be used to determine if there is sufficient space in a storage compartment 267 to contain a delivery container 277 and/or transfer container 278.

Some storage compartments, such as storage compartments located vertically higher within a storage compartment module 203, 205, 207, 209 or the control station 201, such as storage compartments 233, 235, 253, 255 may also include a reflective surface, such as a mirror, on the inside top, sides and/or back of the storage compartment to enable a customer who cannot see directly into the storage compartment to determine via a reflection off the reflective surface whether they have removed all of the items from the storage compartment. In a similar manner, a reflective surface may be included on the bottom, sides or back of a storage compartment, such as storage compartment 239, located lower within a storage compartment module 203, 205, 207, 209 or the control station 201, so customers can determine via a reflection, and without having to bend all the way down to see into the storage compartment, whether all items have been removed.

In another example, the pickup location 200 may also include a storage compartment module configured as a drop-box (not shown). Rather than utilizing specific storage compartments of the pickup location 200 to store returned items and/or items for delivery, a storage compartment module configured as a drop-box may be utilized to securely store such items. For example, a drop-box may be configured with a pivoting door or tray that allows items to be placed in the drop-box but not retrieved without having additional access to the drop-box. In some examples, the pivoting door or other form of access may also be locked and access only provided in response to a customer interacting with the user interface 211, such as selecting to return an item.

The storage compartment modules 203, 205, 207, 209 as well as the control station 201 may also include self-leveling feet 279 that may be used to level the storage compartment modules 203, 205, 207, 209 and/or control station 201 when located on un-level surfaces. In addition, the self-leveling feet 279 may also be adjusted so that a storage compartment module, such as storage compartment module 205, 207, can be positioned so it is flush and aligned with a control station 201 or another storage compartment module. As an alternative to self-leveling feet 279, any other type of support mechanism may be utilized with various implementations described herein for supporting the control station 201 or any storage compartment module 203, 205, 207, 209. Also, the control station 201 and one or more of the storage compartment modules 203, 205, 207, 209 may utilize different types of support mechanisms. For example, the control station 201 may utilize self-leveling feet while the storage compartment modules 203, 205, 207, 209 may utilize rolling casters or wheels. The casters/wheels may further enable the ease with which storage compartment modules may be added or removed from a control station 201, thereby allowing the easy addition/removal of capacity at the pickup location 200.

Figure 3:
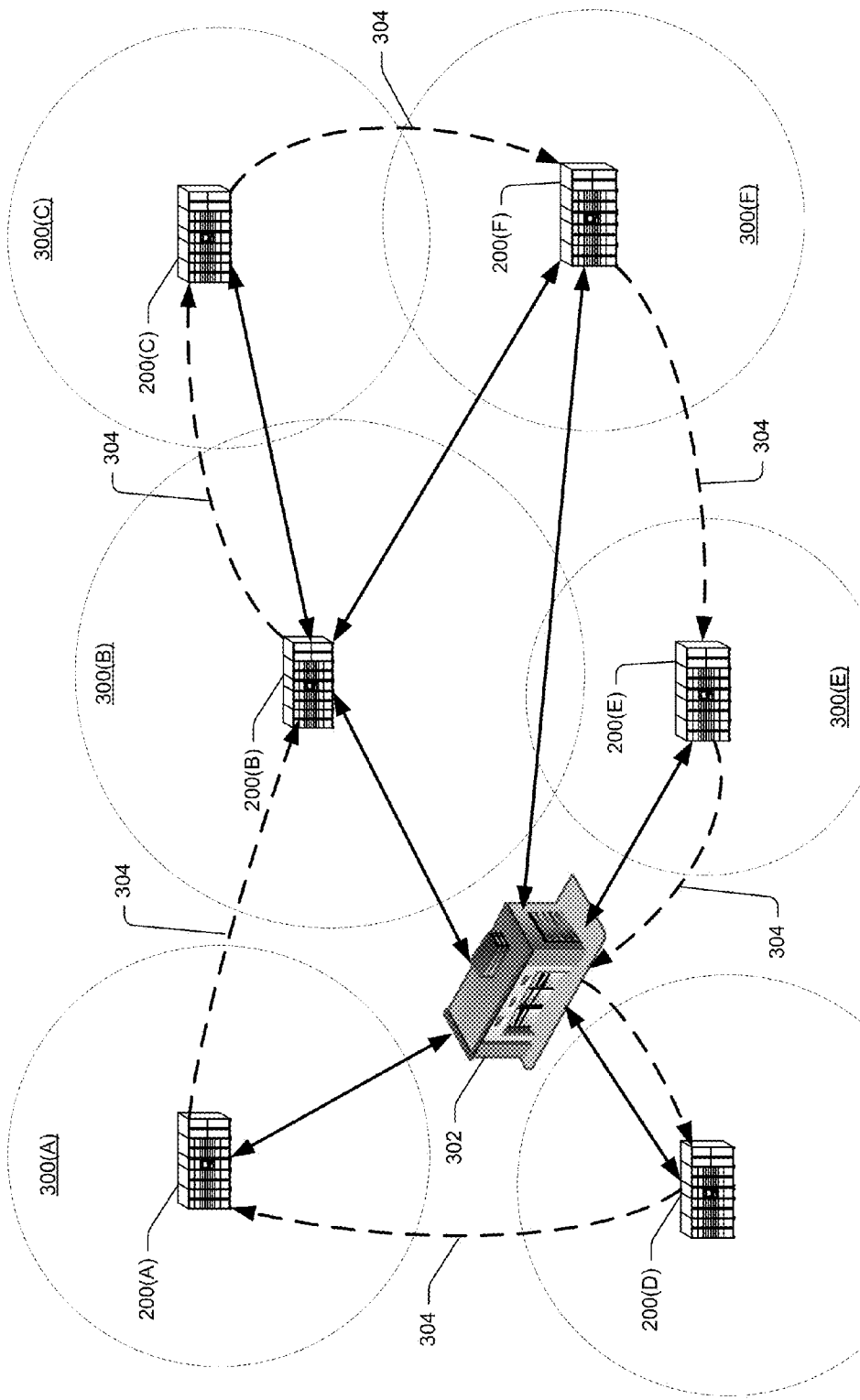
FIG. 3 depicts a block diagram of a group of distributed pickup locations and ranges served by each pickup location, in one implementation.

FIG. 3 depicts a block diagram of a group of distributed pickup locations 200(A), 200(B), 200(C), 200(D), 200(E), 200(F) and corresponding geographic ranges 300(A), 300(B), 300(C), 300(D), 300(E), 300(F) typically served by each pickup location 200(A)-200(F), in one implementation. As described in more detail herein, when an order for one or more items is placed by customer, a shipment set will be assigned to a materials handling facility 302 for fulfillment and delivery to the customer. By strategically placing pickup locations 200, a customer may select a pickup location, such as pickup location 200(A) that is in a geographically convenient location 300(A) as the delivery destination, rather than having the order delivered to their house, apartment, office or other location. This may be convenient to the customer if they may not be available when the item would otherwise be delivered to the location, may not want others located at alternative delivery locations to know that they have ordered an item (e.g., a mother may not want a gift for their child delivered to the house) or may not want the item left at an unsecure location (e.g., front port, mailroom) if they are not present when the item is delivered.

When a customer places an order for one or more items, an order planning system may determine if there is a pickup location, such as pickup location 200(A), within a geographic range 300(A) of where the customer may wish to have the items delivered. In some instances, a customer may designate or preselect preferred pickup locations 200, such as pickup location 200(A), 200(B). For example, a customer may designate one pickup location 200(A) as a preferred pickup location near the customer's home and a second pickup location 200(B) as a pickup location near the customer's work. If an identified pickup location is available, the order planning system may determine if there is available capacity to receive the customer's order prior to allowing the customer to select the pickup location for delivery of an order. As described in more detail herein, for items that have been ordered with a pickup location 200 designated as the delivery location, the materials handling facility 302 will prepare and ship the orders to each of those pickup locations without packaging those orders. For example, orders assigned to pickup location 200(A) may be picked directly into one or more delivery containers, transported to the pickup location 200(A), placed in storage compartments of the pickup location 200(A) and made available for retrieval by the customers. In other implementations, the pickup locations, such as pickup location 200(E) may also be used as a transfer station, for storing transfer containers that include shipment sets for retrieval by a carrier (e.g., local carrier, bike messenger) and delivered to destinations within the geographic range 300(E) surrounding the pickup location 200(E). For example, a group of shipment sets may be scheduled for final delivery to homes within the geographic range 300(E). Agents at the materials handling facility 302 may pick, pack (and/or place in a transfer container), sort and deliver those shipment sets to the pickup station 200(E). Upon arrival, the transfer containers, or shipment sets, are identified as arrived at the pickup location 200(E), stored in one or more storage compartments at the pickup location 200(E) and a carrier may be notified that the shipment sets are available for retrieval and final delivery to their locations within geographic range 300(E). In other implementations, the carrier may already have a pre-arranged time during which they are to arrive and retrieve shipment sets stored in the pickup location 200(E) for final delivery to customers within the geographic range 300(E). The carrier, upon arriving at the pickup location 200(E), may access the storage compartment(s), retrieve the shipment sets and deliver those shipment sets to their final destinations within the geographic range 300(E).

In another example, while a shipment set may be originally scheduled for delivery direct to the customer (e.g., the customer's home), at a time prior to delivery the customer may select to have the shipment set redirected and delivered to a pickup location. In such an example, if the shipment set has not yet left the materials handling facility it may be re-designated for shipment directly to the customer. However, if it is in transit, it may be re-routed to the pickup location or retrieved from a transfer container and placed into a storage container at the pickup location. For example, if the shipment set has been selected for delivery to the customer with the pickup location acting as a transfer station, upon arrival of the order to the pickup location, rather than storing it with other order for final delivery, the pickup location may provide instructions to retrieve the item(s) of the shipment set from a transfer container and place them in a storage compartment of the pickup location for retrieval by the customer. Likewise, if the order was originally scheduled for delivery to a pickup location, the shipment set may be altered for delivery directly to the customer's home.

In another example, a pickup location 200, such as pickup location 200(B), may also be used as a transfer location for one or more shipment sets scheduled for final delivery at yet another pickup location 200, such as pickup location 200(C). In this example, one or more items of a shipment set scheduled for delivery to the pickup location 200(C) may be picked into a transfer container (or delivery container) at the materials handling facility 302, transported to the pickup location 200(B) and stored in a storage compartment for subsequent retrieval by a carrier that will transport the container to the final pickup location 200(C). Similar to the example provided above with respect to transfer containers, the carrier may be notified that the container is stored at the pickup location 200(B), retrieve the container, and possibly other transfer containers or shipment sets, and deliver the container, which is now considered a delivery container, to the final pickup location 200(C) for placement of the items into storage compartments for retrieval.

In yet another example, a transfer container may be transitioned between multiple pickup locations 200. For example, a transfer container with shipment set that are to be delivered to locations within the geographic range 300(F) surrounding pickup location 200(F) may first be transported from the materials handling facility 302 to pickup location 200(B) and stored in pickup location 200(B). After storing, the transfer container may be retrieved by a carrier and transported to pickup location 200(F) and stored in pickup location 200(F). Finally, the transfer container may be retrieved by another carrier and the shipment sets delivered to customers within the geographic range 300(F) surrounding the pickup location 200(F).

In addition to transporting items from the materials handling facility 302 to pickup locations 200, implementations described herein may also be used to retrieve items from pickup locations and transport those items to the materials handling facility 302, to other pickup locations, or to other destinations. For example, if items located at pickup location 200(D) are to be returned to the materials handling facility 302, they may be retrieved as part of the process of transporting items to the pickup location 200(D) from the materials handling facility 302. For example, after items transferred from the materials handling facility to the pickup location 200(D) are dropped off, the items to be returned may be retrieved from the pickup location 200(D) and placed into the delivery container that was used to transport the items to the pickup location 200(D). Those items may then be returned to the materials handling facility 302. In addition, empty delivery containers and/or transfer containers may be retrieved and returned to the materials handling facility 302.

In another implementation, delivery containers and/or transfer containers may be routed from the materials handling facility 302 directly to each of the pickup locations 200, or may be combined into one or more routes followed by a transportation unit. For example, delivery containers and transfer containers for each of the pickup locations 200(A)-(F) may be sequenced and loaded into a transportation unit (e.g., truck, van, trailer, etc.) and routed to each of the pickup locations 200(A)-(F). For example, a transportation unit may be loaded with delivery containers and transfer containers at the materials handling facility 302 for drop-off at each of the pickup locations 200(A)-(F) according to a loading plan that corresponds with the route 304. In such an example, the delivery containers and transfer containers, and optionally the picking of items for those containers, may be sequenced such that the delivery containers and transfer containers for pickup locations 200(E) are loaded first, followed by the delivery containers and transfer containers for pickup location 200(F). The third set of delivery containers and pickup containers sequenced for loading would be those to be dropped off at pickup location 200(C). Sequencing the loading of the transportation unit may proceed in this manner, with the final set of delivery containers and transfer containers to be loaded being those scheduled for drop-off at pickup location 200(D), which is the first pickup location on the route 304.

Once loaded, the transportation unit traverses the route 304 by moving from the materials handling facility 302 to pickup location 200(D). At pickup location 200(D) the delivery container(s) assigned to pickup location 200(D) may be received as described below with respect to FIGS. 7-9 and the transfer containers assigned to pickup location 200(D) may be received as described below with respect to FIGS. 10-11. In addition, any returns, shipping or reallocation of items may also be processed, as described below with respect to FIG. 14. Once each of the processes have been completed at pickup location 200(D), empty delivery containers and/or transfer containers may be collected and the transportation unit may progress along the transportation route to the next pickup location 200(A) and complete the same process at that pickup location 200(A). The transportation unit may continue along route 304 dropping off delivery containers and transportation containers, and pickup up any items for shipping, returns and/or reallocation, until it completes the route and returns to the materials handling facility 302.

In addition to lowering fulfillments costs and providing convenient pickup locations for customers, utilizing the pickup locations to store transfer containers for subsequent pickup and delivery to customers provides an unmanned and automated solution for delivering items. In contrast to normal delivery methods, which utilize manned stations for sorting, routing and processing shipment packages, utilization of the pickup location to store transfer containers removes many of the existing drawbacks. For example, normal delivery typically requires that items be at a facility by a particular time (e.g., 4:00 pm) to allow for next day delivery. However, those items may then sit or be routed within that facility and not depart for delivery until 7:00 am the following day. In the example processes, transfer containers may be dropped off at the pickup location just minutes before they are retrieved by a carrier for final delivery.

Figure 4:
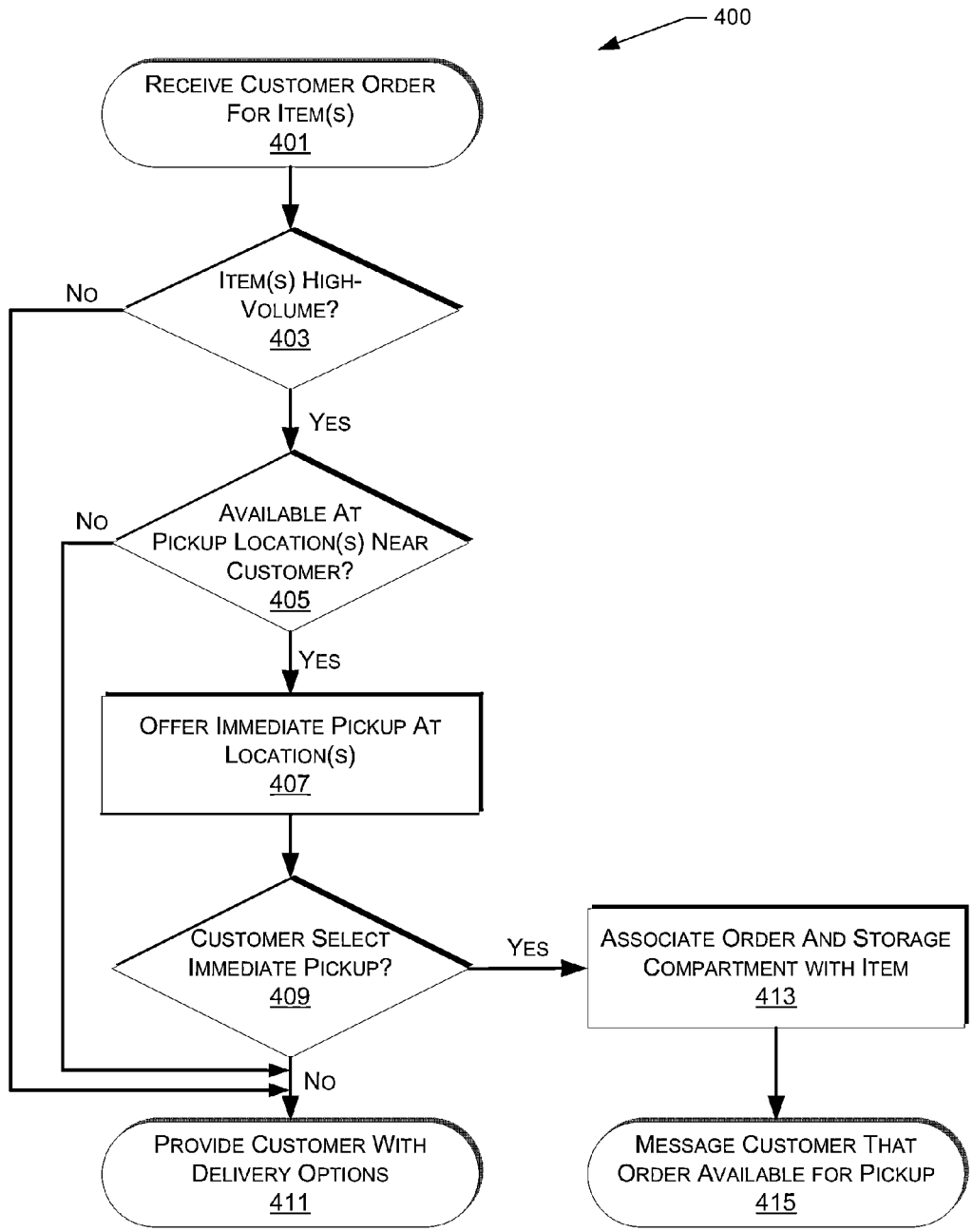
FIG. 4 is a flow diagram illustrating an example process for receiving a customer order for an item or group of items.

FIG. 4 is a flow diagram illustrating an example process 400 for receiving a customer order for an item or group of items. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 400 begins with the receipt of a customer order for one or more items, as in 401. Upon receiving a customer order for one or more items, the process determines whether one or more items ordered by the customer are high-volume items, as in 403. A high-volume item may be, for example, an item that is frequently ordered, such as a popular book, shoe, video game, etc. As discussed below, high-volume items may be transferred and stored in storage compartments of a pickup location prior to order by a customer.

If it is determined that the item being ordered is a high-volume item, a determination is made as to whether the item is available at a pickup location near the customer, as in 405. Determining whether an item is available at a pickup location near a customer may be done in a variety of ways. For example, if a customer is utilizing a mobile computing device that provides positioning information, such as GPS, the system may receive that positioning information along with the customer's order and determine if there is a pickup location within a geographic range of the customer's determined location. In other implementations, the system may ask the customer for their present or planned location, determine location based on the delivery destination of prior orders, determine location based on the IP address associated with the computing device through which the customer is currently placing the order, or any other type of location determination mechanism.

If it is determined that the high-volume item is available for pickup at a location near the customer, the customer is offered the option to have the item available for immediate pickup at the determined pickup location, as in 407. Upon offering to have the item available for immediate pickup at the identified pickup location, it is determined whether the customer has selected immediate pickup for the item, as in 409.

If the customer does not want to have the item available for immediate pickup at the identified pickup location, as in 409, if it is determined that the item is not a high-volume item, as in 403, or if it is determined that the item is not available at a pickup location near the customer, as in 405, the example process 400 will provide the customer with other available delivery options, as in 411. Other available delivery options may include, but are not limited to, delivery to a pickup location or delivery to a customer's home.

In addition to high-volume items, if the item(s) ordered are release day delivery items, the customer may also be provided the option to have the item available for retrieval at a pickup location immediately upon release day. In some examples, release day delivery items may already be stored in storage compartments of various pickup locations or transported and placed in storage compartments of various pickup locations before release day.

If it is determined that the customer does desire to have the item available for immediate pickup at the identified pickup location, as in 409, the customer's order for that item and the storage compartment at the identified pickup location containing the item are associated such that the item is no longer available for another order, as in 413. For example, if the item is in a specific storage compartment at the identified pickup location, that storage compartment is associated with the customer's order for that item.

Upon associating the customer's order for that item with the storage compartment at the identified pickup location, as in 413, a message is delivered to the customer that the ordered item is available for pickup, as in 415. The message to the customer may include a unique identifier, a location or address of the pickup location, directions to the pickup location and a summary of the ordered items available for pickup. The message may be in the form of an e-mail, telephone call, text message, or any other type of communication that will inform the customer that the ordered item(s) is available for pickup at the pickup location.

Figure 5:
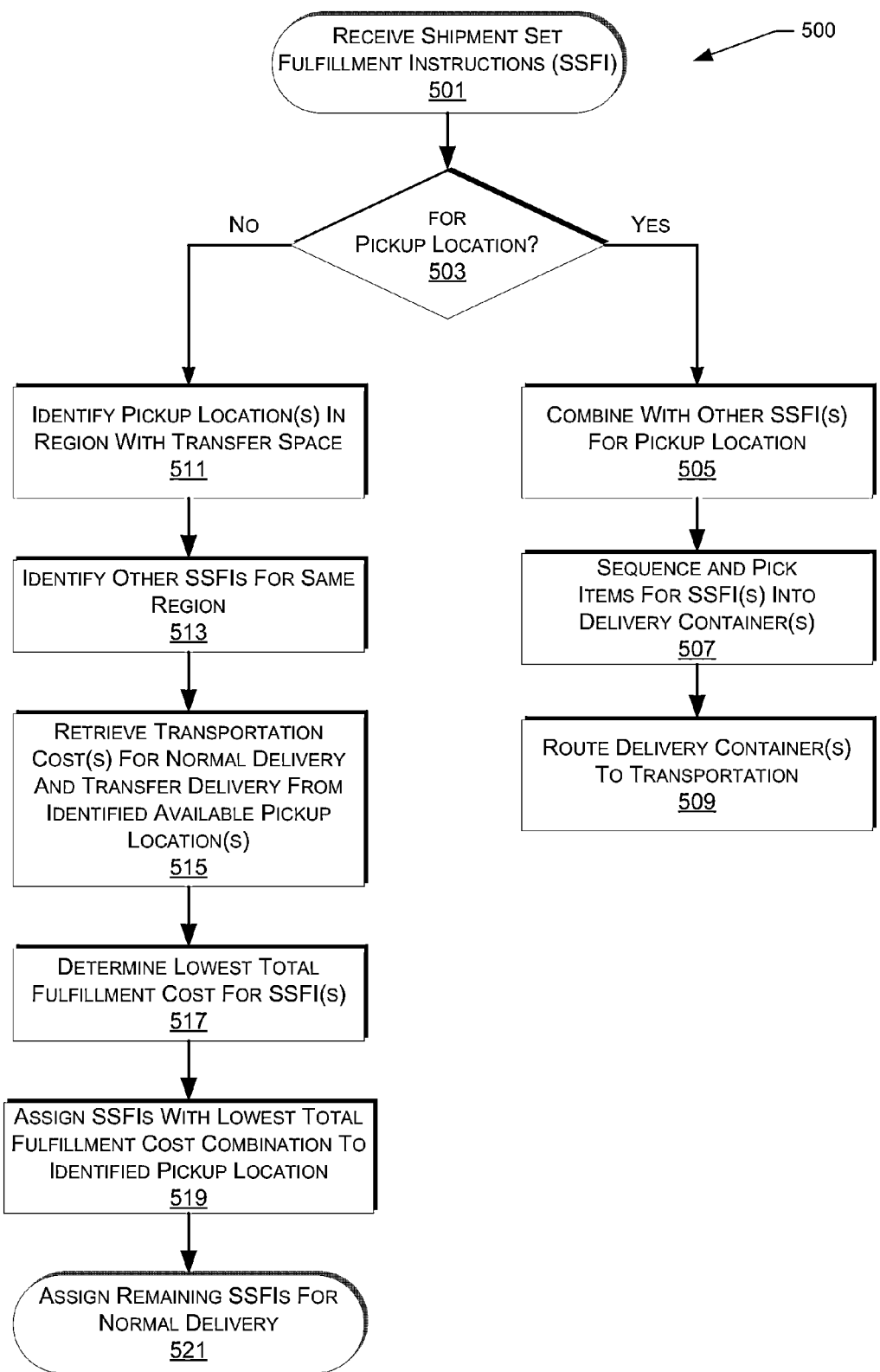
FIG. 5 is a flow diagram illustrating an example process for receiving shipment set fulfillment instructions at a material handling facility.

FIG. 5 is a flow diagram illustrating an example process 500 for processing shipment set fulfillment instructions (SSFI) at a materials handling facility. A SSFI may include instructions necessary for use by a materials handling facility to fulfill and ship a shipment set. For example, an SSFI may include an identification of items to be picked from inventory within the materials handling facility, any necessary packaging requirements for the shipment set and delivery destination for the associated shipment set. In addition to fulfilling shipment sets, SSFIs may also be used to initiate transport of high-volume items to one or more pickup locations prior to the items being ordered. For example, SSFIs may be generated for high-volume items prior to order by a customer such that the items will be stored in storage compartments at various pickup locations and available for immediate pickup when a customer places an order for the high-volume item.

The example process 500 initiates when a SSFI is received at a materials handling facility, as in 501. Upon receiving a SSFI, a determination is made as to whether the shipment set associated with the received SSFI has a pickup location as a final delivery destination, as in 503. If the associated shipment set is scheduled for final delivery at a pickup location, the SSFI, or the associated shipment set, is combined with other SSFIs, or other associated shipment sets, with the same pickup location as the final delivery destination, as in 505. The items identified in the combined shipment sets are sequenced and picked into delivery containers, as in 507. Sequencing and picking of items may be done in a variety of manners. For example, items may be sequenced such that agents within the materials handling facility picking the items traverse the shortest path possible through the materials handling facility as they pick items. In this example, items from multiple different combined shipments set may be picked by a single agent and placed into a delivery container, while other items of those shipment sets may be picked by other agents and placed in other delivery containers. In an alternative implementation, picking of items may be sequenced such that items of the same shipment set are picked together and placed in the same delivery container.

Once the items of the combined shipment sets have been picked, as in 507, the process continues by routing the delivery containers that include the picked items to transportation, as in 509.

Returning to decision block 503, if it is determined that the shipment set associated with the received SSFI is not scheduled for final delivery at a pickup location, pickup locations within a geographic region for which the items of the shipment set are to be delivered are identified, as in 511. In addition, it is determined whether those identified pickup locations also have available transfer space. Transfer space may be any available storage compartment space or other storage availability in the identified pickup location in which transfer containers and/or items scheduled for delivery to a destination other than the pickup location may be securely stored. In some implementations, a transfer space may be an entire storage compartment module of a pickup location, such as storage compartment module 209 of pickup location 200 (FIG. 2). In other implementations, transfer space may be dynamically determined based on the existing and/or planned availability of the pickup location. In still other implementations, the transfer space may be part of a storage compartment in which other transfer containers or delivery containers are or may be stored. In addition to identifying pickup locations within a geographic region with available transfer space, other SSFI(s) with final delivery locations within the same geographic region surrounding the identified pickup location are identified, as in 513. In some implementations, this determination of additional SSFI(s) may be done provided there is additional transfer space available at the identified pickup location.

Transportation costs for normal delivery of the shipment set and transportation costs for transfer delivery from the identified available pickup location for each of the identified shipment sets is retrieved, as in 515. Normal delivery, as used herein, is delivery from a materials handling facility utilizing any conventional delivery carriers, such as a post office, UPS, Federal Express, etc. In one example, the transportation costs for normal delivery are determined by providing the shipping package dimension and/or weight information (when packed) in which the shipment set will be packed to a transportation costing service (not shown). The transportation costing service may maintain transportation costs from various carriers that are determined based upon the volume and/or weight of the shipping package to be shipped. Transportation costs may be provided by the carriers themselves or calculated based on past events with those carriers from respective materials handling facilities. Alternatively, the transportation costing service may estimate normal transportation costs based on industry averages for transporting items of various volumes and/or weights.

Estimated transportation costs for transfer delivery, which may include costs to transfer the shipment set from the materials handling facility to a pickup location and from the pickup location to the final destination, may be determined in a similar manner. For example, the carriers that will retrieve transfer containers from a pickup location may provide information to the transportation costing service identifying the cost to deliver items within a geographic range surrounding the pickup location. Those costs may be based on, for example, the number of orders to be delivered, the total distance traveled to deliver the orders, the time of day, etc. Alternatively, estimated cost information for carriers available to retrieve and deliver orders from a pickup location may be maintained based on prior experiences with those carriers. Likewise, the transportation costing service may also maintain cost information for transporting transfer containers from the materials handling facility to the pickup location.

Upon receiving the transportation cost for each of the shipment sets, a lowest total fulfillment cost for the received and identified shipment sets is determined, as in 517. For example, $5.00 may be estimated as the total fulfillment cost for transfer shipment—to transfer the item from the materials handling facility to the identified pickup location and to have a carrier retrieve the item and complete the delivery. Provided that the estimated fulfillment cost to ship this item using normal delivery—shipping the item via carrier from the materials handling facility to the destination—does not exceed the estimated transfer delivery cost of $5.00, transfer delivery will be determined to be the lowest total fulfillment cost. In another example, if there are multiple shipment sets, the normal delivery cost for each may be determined and combined and the total cost to deliver the shipment set using transfer delivery may also be determined and the lowest total fulfillment cost for all of the shipment sets selected. Combining shipment sets for transfer delivery may reduce the transportation cost as the cost for the transportation unit may be shared across the shipment sets as they are transported in the same shipment unit. In still other examples, if there are other delivery containers also scheduled for transport to the pickup location, the total transfer cost may also consider the cost savings that may be associated with transporting the transfer containers in the same transportation unit as the delivery containers. In some examples, the cost of transportation may be reduced by combining orders for delivery using transfer delivery.

Once the lowest total fulfillment costs for one or more shipment sets are determined, if the lowest cost is transfer delivery, the shipment sets are scheduled for transfer delivery via the identified pickup location, as in 519. Assigning the shipment sets for transfer delivery may also include contacting and engaging a carrier (such as a local carrier) to retrieve and provide final delivery of the shipment sets. In other examples, a carrier may be pre-scheduled for periodic retrieval of items from the pickup location for final delivery. For any remaining shipment sets that are not allocated for transfer delivery, or for which no identified pickup location with available transfer space was available, they are assigned normal delivery, as in 521.

Figure 6:
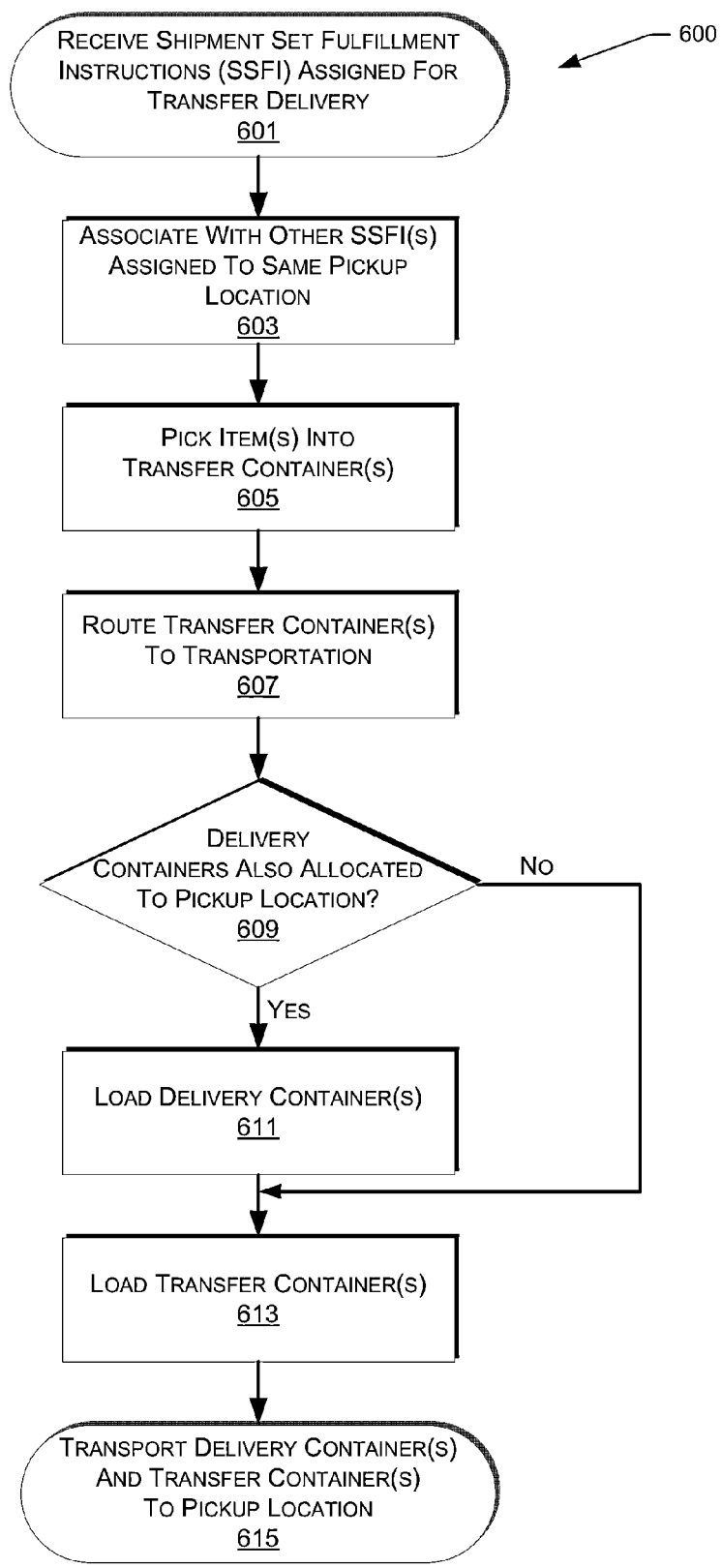
FIG. 6 is a flow diagram illustrating an example process for processing shipment set fulfillment instructions assigned for transfer delivery.

FIG. 6 is a flow diagram illustrating an example process 600 for processing a shipment set fulfillment instruction assigned for transfer delivery. The example process 600 initiates upon receipt of a SSFI assigned for transfer delivery at 601. A SSFI assigned for transfer delivery may be identified, for example, according to the process described above with respect to FIG. 5.

Upon receiving a SSFI assigned for transfer delivery, the SSFI, and the corresponding shipment set is associated with other SSFIs assigned for transfer delivery via the same pickup location, as in 603. SSFIs may be assigned the same pickup location if, for example, the corresponding shipment sets are to be delivered to final destinations within a geographic range surrounding the assigned pickup location. In other implementations, a SSFI may be assigned the same pickup location if it is to be picked up by a carrier and transported to yet another pickup location or another destination rather than delivery within the geographic region surrounding the pickup location.

Upon associating the received SSFI with other SSFIs assigned to the same pickup location, the items of those shipment sets are picked, packed, and/or placed in transfer containers, as in 605. As discussed above, picking and/or packing of items may be sequenced and performed in a variety of manners. For example, items of combined shipment sets for transfer delivery via the same pickup location may be sequenced such that picking results in items of the same order being picked and placed in the same transfer container. Similarly, the routing of a carrier for final delivery of the shipment sets may also be considered when sequencing picking of items such that items for shipment sets are picked in a sequenced order. For example, shipment sets may be picked such that adjacent shipment sets on the final delivery route will be included in the same transfer container. As the transfer containers are filled, they are routed to transportation, as in 607. In implementations where delivery containers and/or transfer containers for multiple different pickup locations will be loaded on the same transportation unit for delivery, the containers may be sequenced to correspond to the route the transportation unit will deliver the containers—the delivery containers and transfer containers to be dropped off at the first pickup location loaded last, and other containers loaded in the sequence in which they will be dropped off.

As part of the example process 600, a determination is made as to whether there are also delivery containers allocated for the same pickup location, as in 609. If it is determined that delivery containers are also allocated for transport to the same pickup location, delivery containers are routed and loaded into one or more transportation units for transport to the pickup location, as in 611. After the delivery container(s) are loaded in the transportation unit(s), or if it is determined that there are no delivery containers currently scheduled for transport to the pickup location, the transfer container(s) are loaded into one or more transportation units for transport to the pickup location, as in 613. In other implementations the operation of blocks 611 and 613 may be performed in reverse, such that transfer containers are loaded prior to delivery containers. In still other implementations delivery containers may be loaded in one transportation unit while transfer containers are loaded in a separate transportation unit. In yet another implementation, delivery containers and transfer containers may be randomly loaded into a transportation unit for delivery to the pickup location. Finally, the delivery containers and transfer containers are transported to the pickup location, as in 615.

Figure 7:
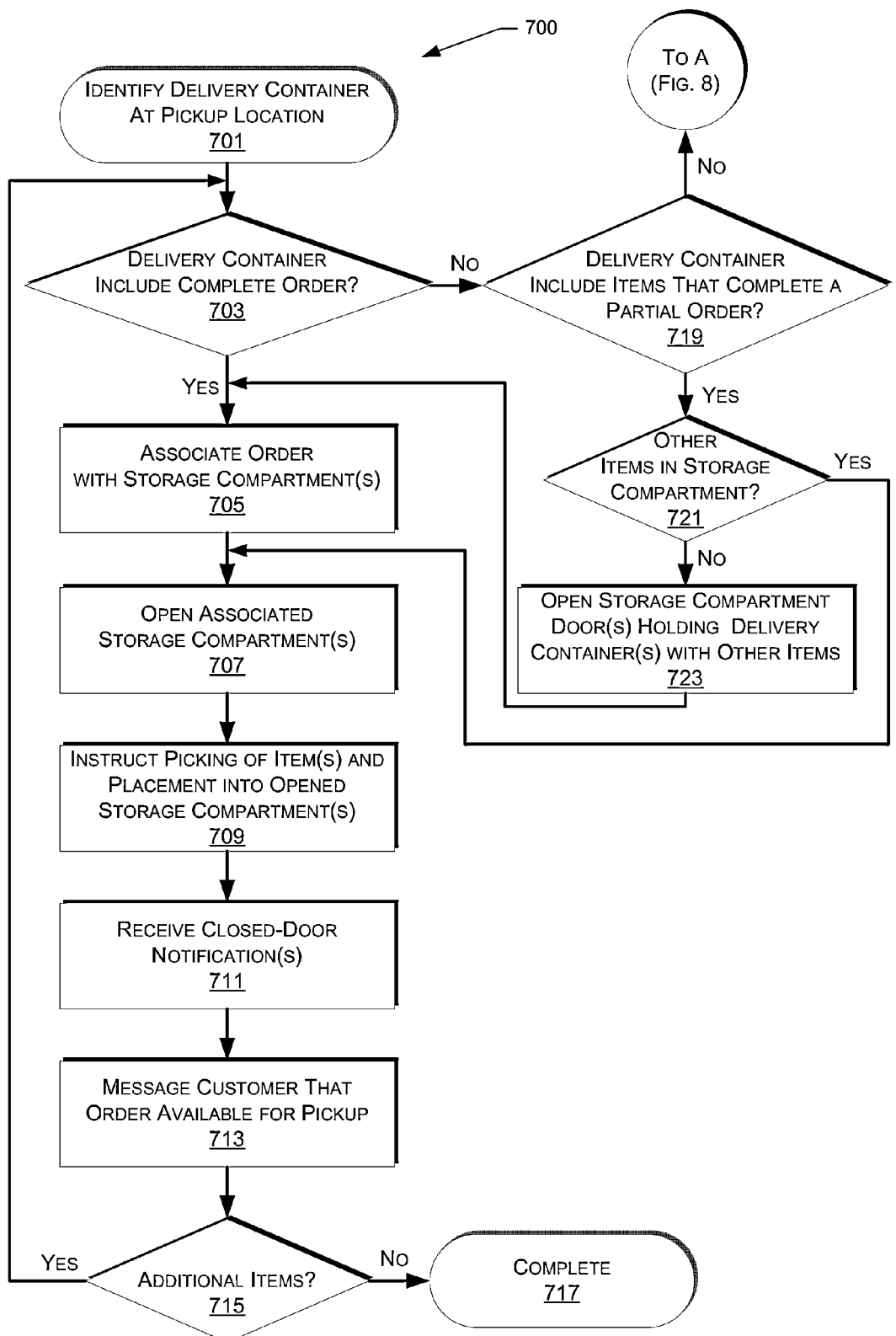
FIGS. 7-9 is a flow diagram illustrating an example process for receiving a delivery container at a pickup location.
Figure 8:
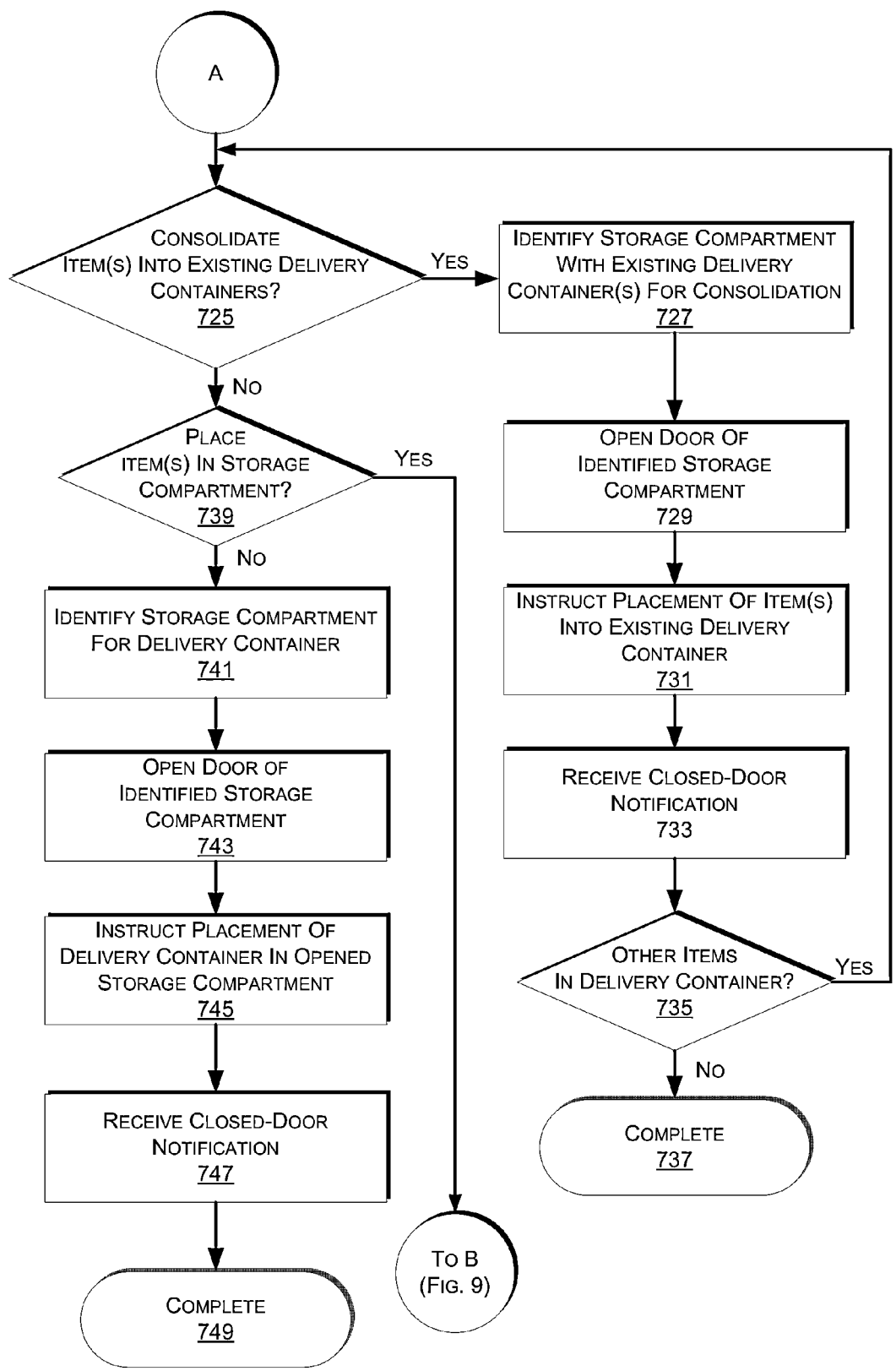
Figure 9:
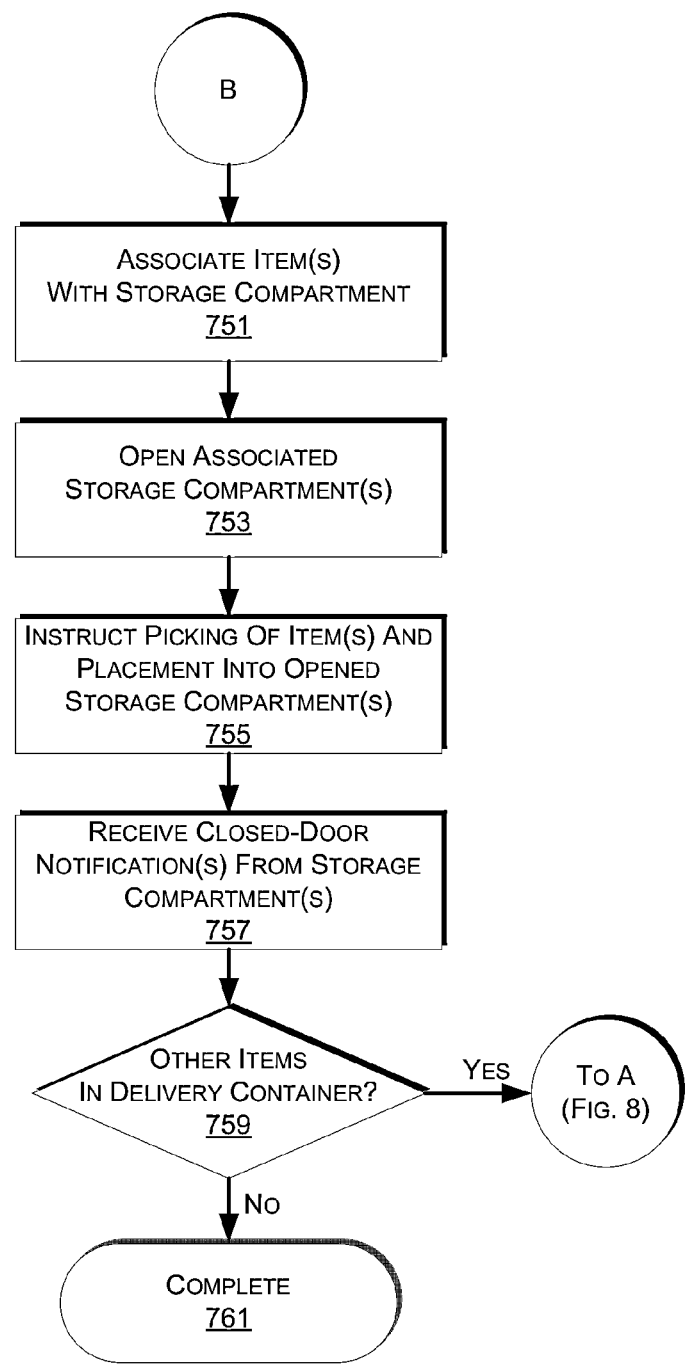

FIGS. 7-9 is a flow diagram illustrating an example process 700 for receiving a delivery container at a pickup location. The process 700 begins upon receipt and identification of a delivery container at a pickup location, as in 701. In some implementations, the process for receiving delivery containers in a pickup location can be supported by a carrier that is transporting delivery containers to the pickup location, by a driver of the transportation unit, by any other individual designated to receive delivery containers at a pickup location or through automated processing means, such as robotics. Regardless of the support provided to receive a delivery container, the delivery container is initially identified. For example, a bar code or other identifier of the delivery container may be scanned by a scanning unit of the pickup location, or through use of a handheld scanner. In alternative implementations, an identifier or other code or name that identifies the received delivery container may be manually input into the keypad 217 of the control station 201 at the pickup location 200. Any other form of identification may also be utilized to identify the received delivery container.

Upon receipt and identification of a delivery container, it is determined whether the delivery container includes a complete order, as in 703. A complete order included in a delivery container may be a single item order, or a multi-item order in which all of the multiple items are included in the received delivery container. Also, an order may or may not include all of the items ordered by the customer. For example, a customer may have placed an order for five items but agreed to receive delivery of three of the items early. In such an example the three items, for purposes of this discussion, are considered an order. It will also be understood that while those three items are considered an order, they may be divided among multiple shipment sets.

If it is determined that a complete order is included in the received delivery container, the order is associated with a storage compartment at the pickup location, as in 705. Associating a storage compartment with the order may include obtaining information regarding the dimensions of the item(s) of the order and selecting an available storage compartment in which the item(s) will fit. Item dimension information may be received from a central control system, or materials handling facility that is in communication with the pickup location. For multi-item orders, if all of the items will not fit in one storage compartment, the order may be associated with multiple available storage compartments. Upon associating the order with a storage compartment(s) at the pickup location, the storage compartment(s) is opened, as in 707. As discussed previously, a storage compartment may be opened by the command component of the control station 201 issuing an open storage compartment instruction to a storage compartment management component of a corresponding storage compartment module 203, 205, 207, 209 identifying the storage compartment of that storage compartment module that is to be opened. The storage compartment management component, upon receipt of an open storage compartment instruction, may cause the lock on the storage compartment to disengage, thereby allowing the door to open.

In another implementation, rather than associating an order with a storage compartment when it is identified as received in a delivery container, the control station 201 may receive instructions from a warehouse management system or capacity planning system identifying the storage compartment of the pickup station that is to be utilized for making the order available to a customer for pickup.

Once an associated storage compartment has been opened, instructions for taking the items from the received delivery container and placing them into the open storage compartment are issued, as in 709. For example, instructions may be provided via the display screen 213 of the control station 201, or wirelessly transmitted to a handheld device, or provided via any other communication means. In addition to issuing instructions to pick the items from the delivery container and place them into the open storage compartment, the process may also include monitoring the opened storage compartment to confirm receipt of the items that are to be placed in the open storage compartment. For example, an image capture device 273 included within the open storage compartment may be used to visually monitor and optionally record video of placement of the items in the storage compartment. In addition or as an alternative thereto, the presence detection sensor 271 and/or motion sensor 272 may be used to detect the presence or absence of objects within the storage compartment and/or the motion of placing an object in the storage compartment. Once ordered item(s) have been placed in the open storage compartment, the storage compartment door is closed and the storage compartment management component receives a closed-door notification, as in 711. The closed-door notification may be related to the command component of the control station 201.

Upon receipt of a closed-door notification and confirmation that the items have been placed in the storage compartment, a message may be delivered to the customer that the items are available for pickup at the pickup location, as in 713. The message may be delivered using any type of communication means, such as e-mail, telephone, text message, etc. In addition to identifying that the item(s) is available for pickup, the message may also include a location or address of the pickup location, directions to the pickup location, hours of operation, a unique identifier that is to be used to obtain access to the items securely stored in the storage compartment at the pickup location, and/or a summary or list of the items ordered that are available for pickup. The message to the customer may be delivered from the pickup location 200 or from a remote computing system, such as an order management system.

After messaging to the customer that the item(s) is available for pickup, as in 713, or upon receipt of the closed-door notification, as in 711, it is determined whether additional items remain in the delivery container, as in 715. If it is determined that additional items remain in the delivery container, the process returns to determining whether the delivery container includes a complete order, as in 703. If it is determined that no additional items remain in the delivery container, the process completes, as in 717.

Returning to decision block 703, if it is determined that the delivery container does not include a complete order, a determination is made as to whether the delivery container includes items that complete a partial order currently stored at the pickup location, as in 719. As will be described further with respect to process 700, portions of an order may be received at a pickup location at different times, or time intervals. When portions of an order do not arrive during the same time interval, the items may not be placed into a storage compartment for customer pickup and may have to wait for one or more additional items of the order to arrive at the pickup location before completion and placement of the items into a storage compartment for pickup. In other implementations, the items may be placed in a storage compartment, but the customer may not be notified that they are available for pickup until the remaining items arrive and are consolidated in the storage compartment with the existing items. In other implementations, the customer may be notified that some if the items have arrived and are available for pickup.

If it is determined that the delivery container includes items that complete a partial order currently stored at the pickup location, it is also determined whether the other items stored at the pickup location are stored in a storage compartment that will be used for making the items available for pickup by a customer, as in 721. If it is determined that the other items of the partial order are included in a storage compartment that will be used to make items available for pickup by a customer, the process returns and opens the identified storage compartment, as in 707 and continues. However, if it is determined that the items are not located in a storage compartment that will be used for making items available for pickup by a customer, the storage compartment(s) containing the other items, which may be located in a delivery container stored in a storage compartment, are unlocked and made available, as in 723. In addition to opening the storage compartment(s) containing the other items of the partial order, the process returns to block 705 and associates the order with a storage compartment that will be used to make the items available for pickup by a customer.

Returning to decision block 719, if it is determined that the received delivery container does not include items that complete a partial order, a determination is made as to whether the remaining items in the delivery container should be consolidated into an existing delivery container stored at the pickup location that includes items of other partial orders, as in 725 (FIG. 8). Consolidation of items may occur for a variety of reasons. For example, if the received delivery container only includes a few remaining items and there is an existing delivery container stored in the pickup location that has available space for those items, the contents of the two delivery containers may be consolidated to save space within the pickup location. Similarly, if items in the received delivery container are part of a partial order that includes items currently stored in another delivery container located at the pickup location, those items may be consolidated into the same delivery container. If it is determined that an item of the received delivery container should be consolidated into an existing delivery container currently stored in the pickup location, the storage compartment containing the existing delivery container for which consolidation is to occur is identified, as in 727.

Upon identifying the location of the existing delivery containers for which consolidation is to occur, the storage compartment door securing those existing delivery containers is unlocked and made accessible, as in 729. Instructions are also provided for placement of the item(s) into the existing delivery containers, as in 731. Those instructions may be provided in a variety of manners. For example, instructions may be displayed on the display screen 213 of the control station 201, displayed on an accessible handheld device, or through any other messaging channel. In responding to the instructions, the items are consolidated into the identified existing delivery container. After consolidation, the door to the storage compartment containing the delivery container with the consolidated items is closed, and the process receives a closed-door notification, as in 733. As part of the consolidation of items into a delivery container, an image capture device 273 included in the opened storage compartment that contains the existing delivery container in which consolidation occurs may be used to confirm, and optionally record, the consolidation of items into the existing delivery container. In addition, the presence detection sensor 271 and/or motion sensor 272 may be used to confirm the return and placement of the delivery container into the opened storage compartment prior to closing and locking of the storage compartment door in response to receiving the closed-door notification.

After consolidation of one or more items into the existing delivery container, it is determined whether other items remain in the received delivery container, as in 735. If it is determined that no additional items remain in the received delivery container, the process 700 completes, as in 737. However, if it is determined that other items do remain in the received delivery container, the process returns to decision block 725 and continues.

Returning to decision block 725, if it is determined that items in the received delivery container are not to be consolidated into existing delivery containers stored in the pickup location, a determination is made as to whether the remaining item(s) is to be placed in a storage compartment that will be utilized for making the item available for pickup, as in 739. An item may be placed in a storage compartment that will be used to make the item available to a customer, even though it is a partial order, if the remaining items of the partial order are expected to arrive in the near future, if sufficient capacity is available at the pickup location, if there is no space available for storing the received delivery container. In another example, items of a partial order may also be placed in a storage compartment of a pickup location if a customer desires to retrieve the items early. For example, a customer may select to have the option to retrieve items as they arrive. In such an example, once the first item arrives at the pickup location it may be placed in a storage compartment and the customer messaged that the first item has arrived and may be retrieved. The message may also include a code or other identifier for retrieving the item as discussed herein. The customer may retrieve the item using the code or wait until more items of the customer's order have been received and added to the storage compartment.

If it is determined that the item in the received delivery container is not to be placed in a storage compartment that will be used to make the item available to a customer for pickup, a storage compartment in which the delivery container is to be stored is identified, as in 741, and the door of that identified storage compartment is opened, as in 743. Upon identifying and opening the door of a storage compartment in which the received delivery container is to be placed, instructions are provided for placing the received delivery container in the open storage compartment, as in 745. Similar to the above, the instructions may be provided in a variety of means, such as the display screen 213 of the control station 201, wirelessly to a handheld unit, or through any other sufficient communication means. Once the received delivery container has been placed in the opened storage compartment and the door closed, the process receives a closed-door notification, as in 747, and completes, as in 749.

In some implementations of the example process 700, an image capture device 273 contained within the storage compartment may be used to monitor and confirm that the received delivery container is placed in the open storage compartment prior to the door being closed. For example, the image capture device may record video of the individual placing the received delivery container in the open storage compartment and such video may be processed to confirm the items are there before the control station 201 allows the storage compartment door to be locked. In addition or as an alternative to thereto, the presence detection sensor 271 and/or motion sensor 272 may be used to confirm the presence or placement of the received delivery container into the open storage compartment.

Returning to decision block 739, if it is determined that the item in the received delivery container is to be placed in a storage compartment that will be made available for pickup by a customer, the item is associated with an available storage compartment, as in 751 (FIG. 9). Upon associating the item with a storage compartment that will be used to make the item available for pickup by a customer, the storage compartment is opened, as in 753, and instructions for picking the item from the received delivery container and placing it into the opened storage compartment are provided, as in 755. As discussed above, any technique may be utilized for providing instructions and any type of security measures, such as an image capture device within the storage compartment may be used to monitor and confirm that the items are placed into the storage compartment prior to receiving a closed-door notification and locking the door, as in 757.

Once the items have been placed into the storage compartment and the storage compartment door closed and locked, a determination is made as to whether there are additional items remaining in the delivery container, as in 759. If it is determined that additional items remain in the delivery container, the process 700 returns to decision block 725 (FIG. 8) and continues. However, if it is determined that no additional items remain in delivery container, the process completes, as in 761.

Figure 10:
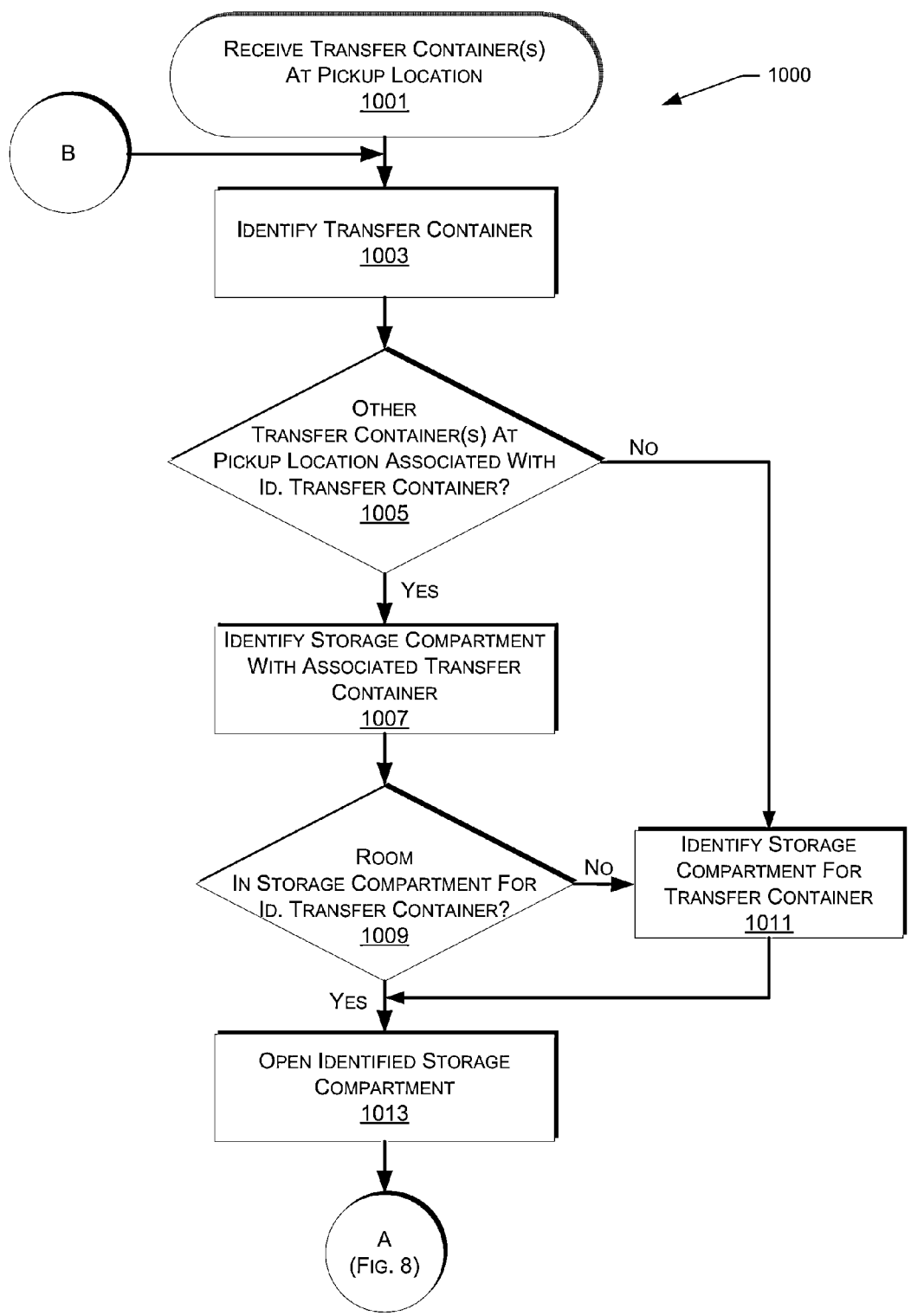
FIGS. 10-11 is a flow diagram illustrating an example process for receiving a transfer container at a pickup location.
Figure 11:
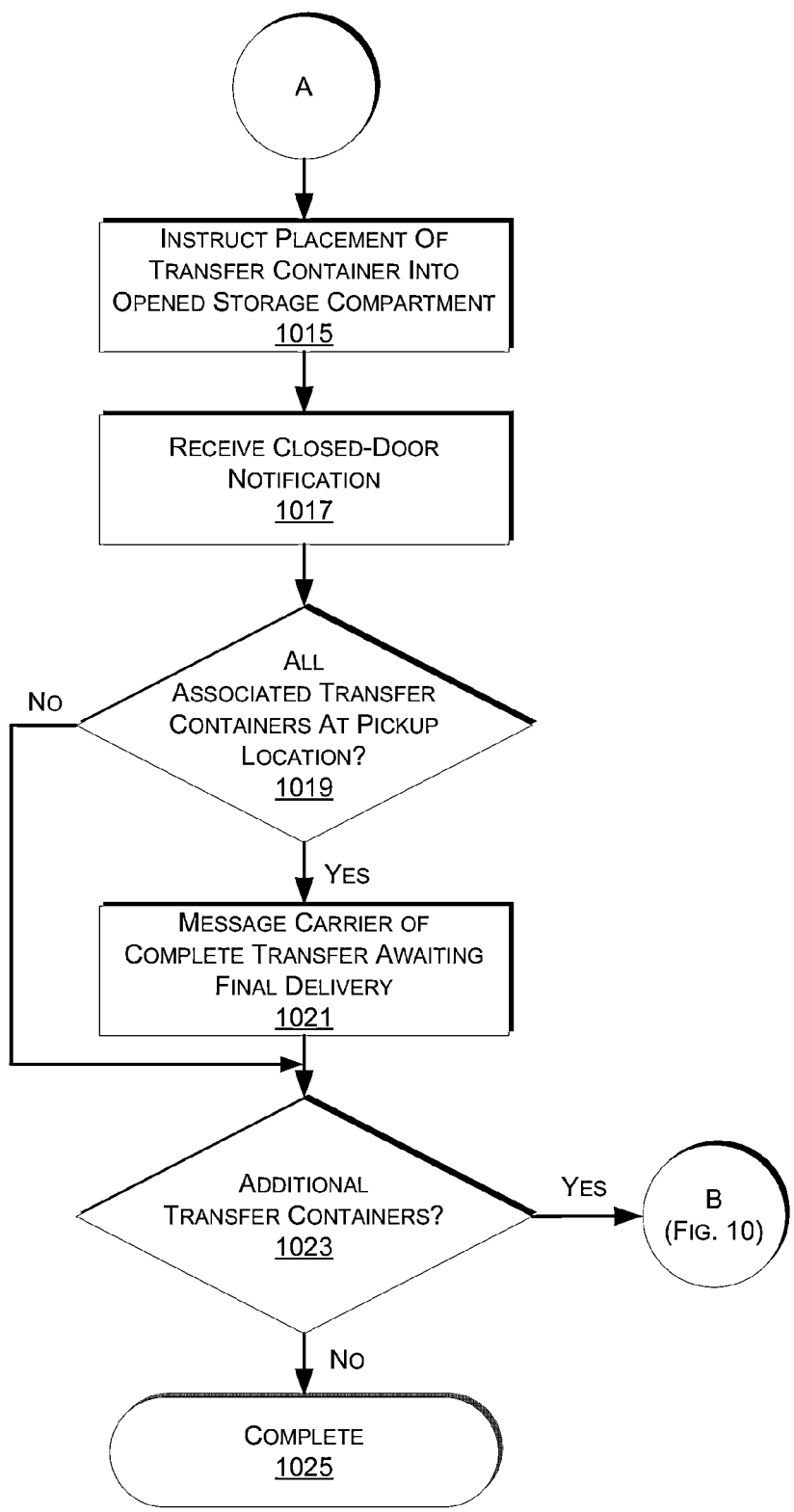

FIGS. 10-11 is a flow diagram illustrating an example process 1000 for receiving transfer containers at a pickup location. Similar to the process described with respect to FIGS. 7-9, the example process 1000 for receiving transfer containers at a pickup location initially receives a transfer container at the pickup location, as in 1001. Similar to receiving a delivery container, as described above, in some implementations the process for receiving transfer containers at a pickup location can be performed by a carrier that is transporting transfer containers to the pickup location, by a driver of the transportation unit, by an individual designated to receive transfer containers at a pickup location, or by automated means, such as robotics. Regardless of the mechanism utilized to receive the delivery container, the delivery container is initially identified, as in 1003. For example, a transfer container may include a barcode or other identifying indicia that may be scanned or input into the pickup location. For example, the transfer container may include a barcode that is scanned at the control station 201 by a scanner or handheld device at pickup location. In alternative implementations, information identifying the transfer container may be manually input via the numeric keypad 217 of the control station 201.

Once the transfer container received at the pickup location is identified, it is determined whether there are other transfer containers at the pickup location associated with the identified transfer container, as in 1005. Transfer containers may be associated if they are to be retrieved together for final delivery to destinations within the geographic range of the pickup location. In some of the implementations, multiple transfer containers may be received at a pickup location, some of those containers scheduled for retrieval and delivery by a first carrier while other of those containers are scheduled for retrieval and delivery by a second carrier. In such an example, the transfer containers scheduled for pickup by the first carrier are associated together and transfer containers scheduled for pickup by the second carrier are associated together. In addition, transfer containers may be received from multiple materials handling facilities that are to be retrieved from the pickup location by a carrier for final delivery. In such an implementation, some of the transfer containers may arrive at the pickup location before the remaining transfer containers and stored at the pickup location until all of the associated transfer containers have arrived.

If it is determined that there are other transfer containers associated with the received and identified transfer container that are currently stored at the pickup location, the process identifies the storage compartment containing the associated transfer container(s), as in 1007. Upon identification of the storage compartments containing the associated transfer containers, a determination is made as to whether there is sufficient room remaining in the identified storage compartment to securely store the received and identified transfer container, as in 1009. Determining whether sufficient room remains in the storage compartment containing the associate transfer containers may be accomplished by illuminating a light in the identified storage compartment and scanning the contents of the identified storage compartment with the image capture device 273 located within the identified storage compartment. This may be done at the time the identified transfer container is received at the pickup location, previously determined when the other associated transfer containers are initially stored in the storage compartments at the pickup location, periodically, or at any other time.

If it is determined that there is not sufficient room in the storage compartment currently containing the associated transfer container(s), or if it is determined at decision block 1005 that there are no other transfer containers located at the pickup location that are associated with the identified transfer container, a storage compartment at the pickup location that is capable of securely holding the identified transfer container is selected and associated with the transfer container, as in 1011. The storage compartment identified for securely holding the identified transfer container may be any storage compartment within the pickup location of sufficient size and capacity for receiving and securing the identified transfer container.

Upon associating the transfer container with an identified storage compartment at the pickup location, the identified storage compartment is opened, as in 1013. As discussed previously, a storage compartment may be opened by the command component of the control station 201 issuing an open storage compartment instruction to the storage compartment management component of a corresponding storage compartment module 203, 205, 207, 209 identifying the storage compartment of that storage compartment module that is to be opened. The storage compartment management component, upon receipt of an open storage compartment instruction, may cause the lock of the identified storage compartment to disengage and allow the door to open.

In addition to opening the identified storage compartment, instructions for placing the received transfer container into the open storage compartment are issued, as in 1015 (FIG. 11). For example, instructions may be provided via the display screen 213 of the control station 201, wirelessly transmitted to a handheld device, or through any other communication channel. In addition to issuing instructions to place the received transfer container into the open storage compartment, the process may also include monitoring the opened storage compartment to confirm that the transfer container is placed in the open storage compartment. For example, an image capture device 273 included within the open storage compartment may be used to visually monitor and optionally record video of the individual placing the transfer container in the storage compartment. In addition or as an alternative thereto, the presence detection sensor 271 and/or motion sensor 272 may be used to detect the presence or absence of objects within the storage compartment and/or the motion of placing an object in the storage compartment. Once the transfer container has been placed in the open storage compartment, the storage compartment door is closed and the process receives a closed-door notification, as in 1017.

Upon receipt of a closed-door notification and confirmation that the transfer container has been placed in the storage compartment, a determination is made as to whether all transfer containers associated with the received transfer are located at the pickup location, as in 1019. If it is determined that there are no are no additional associated transfer containers to be received at the pickup location, a carrier may be messaged that all transfer containers to be retrieved by the carrier have arrived at the pickup location and are awaiting retrieval and final delivery, as in 1021. The message may be delivered from the pickup location or from a remote computing system using any type of communication means, such as e-mail, telephone, text message, etc. In addition to notifying the carrier that the transfer containers are stored at the pickup location and available for retrieval, the message may also include a location or address of the pickup location, directions to the pickup location, hours of operation, and a unique identifier that is to be used by the carrier to obtain access to the transfer containers securely stored in the storage compartment(s) at the pickup location.

While the example process 1000 described includes actively messaging a carrier for retrieval of transfer containers from the pickup location, in other implementations a carrier may be prescheduled to retrieve the transfer containers from the pickup location at a predetermined time. For example, a carrier may be scheduled to retrieve transfer containers from the pickup location early in the morning (e.g., 5:00 am), before traffic or congestion may occur. In such implementations, the delivery of transfer containers to the pickup location may be scheduled by the materials handling facility such that all transfer containers associated with a carrier are delivered and stored in the pickup location prior to the scheduled time of retrieval by the carrier.

In addition to messaging to a carrier that all transfer containers have been received and are stored at the pickup location and awaiting final delivery, or if it is determined at decision block 1019 that there are additional associated transfer containers to be received at the pickup location, a determination is made as to whether there are additional transfer containers to be received at the pickup location, as in 1023. For example, a transportation unit may deliver multiple transfer containers that are to be received at the pickup location. If it is determined that there are additional transfer containers available for receive at the pickup location, the process returns to block 1003 (FIG. 10) and continues. However, if it is determined that there are no additional transfer containers currently available for receive at the pickup location, the process 1000 completes, as in 1025.

Figure 12:
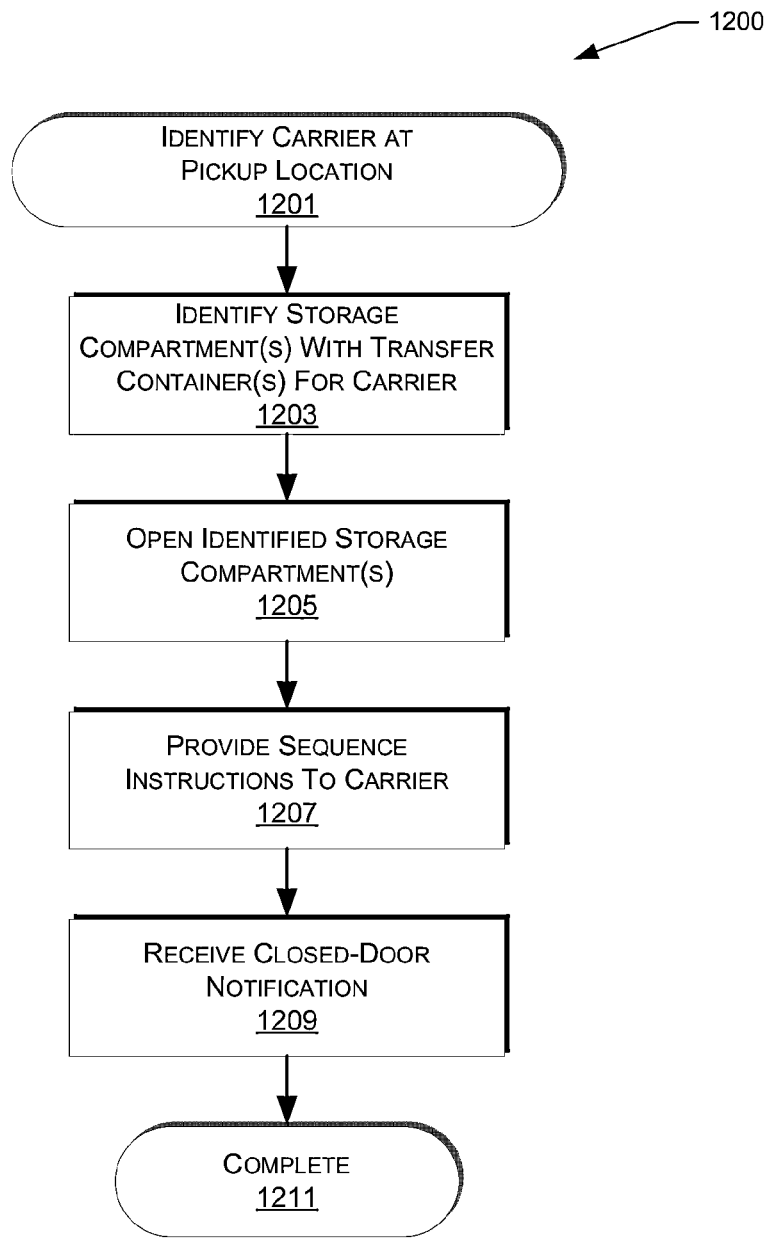
FIG. 12 is a flow diagram illustrating an example process for providing transfer containers at a delivery location to a carrier for final deliver to customers.

As discussed above in FIGS. 10-11, a carrier may be notified when all transfer containers scheduled for retrieval by the carrier have been received and stored at a pickup location. FIG. 12 is a flow diagram illustrating an example process 1200 for providing transfer containers at a delivery location to a carrier for final delivery. When a carrier arrives at the pickup location to retrieve stored transfer containers, the carrier is initially identified, as in 1201. For example, a carrier may input a unique code into the numeric keypad 217 of the control station 201 that was provided to the carrier by the process 1000 when the carrier was messaged that the transfer containers had arrived. In other implementations, the carrier may be identified using a code specific to that carrier, through use of the biometric scanner 219, by scanning a barcode included in the message using the barcode scanner 215, or through any other type of identification means.

Upon identification of the carrier at the pickup location 200, the storage compartment(s) containing the transfer containers scheduled for retrieval by that carrier are identified, as in 1203. Upon identifying the storage compartment(s) at the pickup location, the storage compartment(s) is opened, as in 1205. As discussed previously, a storage compartment may be opened by the command component of the control station 201 issuing an open storage compartment instruction to the storage compartment management component of a corresponding storage compartment module 203, 205, 207, 209 identifying the storage compartment of that storage compartment module that is to be opened. The storage compartment management component, upon receipt of an open storage compartment instruction, may cause the lock to disengage, thereby allowing the identified storage compartment door to open.

Once an associated storage compartment(s) has been opened, instructions for retrieving the transfer containers may be provided to the carrier, as in 1207. For example, if the carrier is scheduled to retrieve multiple transfer containers and the contents of those containers are sequenced to correspond with the delivery route to be followed by the carrier, instructions may be provided to the carrier as to the order in which the transfer containers should be removed. In other implementations, the sequencing instructions may be bidirectional communication. For example, if the carrier is not able to retrieve all of the transfer containers at the same time, the carrier, or the control station 201, may identify which transfer container to retrieve from the pickup location for final delivery. In another implementation, the carrier may identify how many transfer containers it can retrieve at the same time and the control station 201 may identify which transfer container should be retrieved from the pickup location and delivered. For example, the transfer containers may be sequenced such that orders to be delivered early in the morning are included in one transfer container while orders that may be scheduled for delivery later in the day are in another. In this example, the control station 201 may notify the carrier to retrieve the transfer container including the early morning deliveries. In addition to identifying which transfer containers a carrier should retrieve, and in which order, the control station 201 may also provide information to the carrier as to what route to follow in delivering the orders included in the retrieved transfer container(s).

Carriers may not be able to retrieve all of the scheduled transfer containers at one time for a variety of reasons. For example, the carrier may be making final deliveries of orders through use of a bicycle or dolly. Such final delivery mechanisms may be utilized in densely populated areas or when larger transportation units are not available or convenient.

In addition to issuing instructions to retrieve transfer containers, the process 1200 may also include actively monitoring the opened storage compartment to confirm retrieval of the transfer container or retrieval of the appropriate transfer container. For example, an image capture device 273 included within the open storage compartment may be used to visually monitor and optionally record video of the transfer container(s) removal. In addition or as an alternative thereto, the presence detection sensor 271 and/or motion sensor 272 may be used to detect the presence or absence of objects within the storage compartment and/or the motion of retrieving an object from the opened storage compartment. Once the transfer container(s) has been retrieved from the open storage compartment(s), the carrier closes the storage compartment door(s) and the process receives a closed-door notification, as in 1209.

Upon receipt of a closed-door notification and confirmation that the transfer container(s) or the appropriate transfer container(s) have been retrieved from the storage compartment(s), a message may be sent to the materials handling facility that the orders, or a portion thereof, have been retrieved by the carrier and are out for delivery, and the process 1200 may complete, as in 1211.

Figure 13:
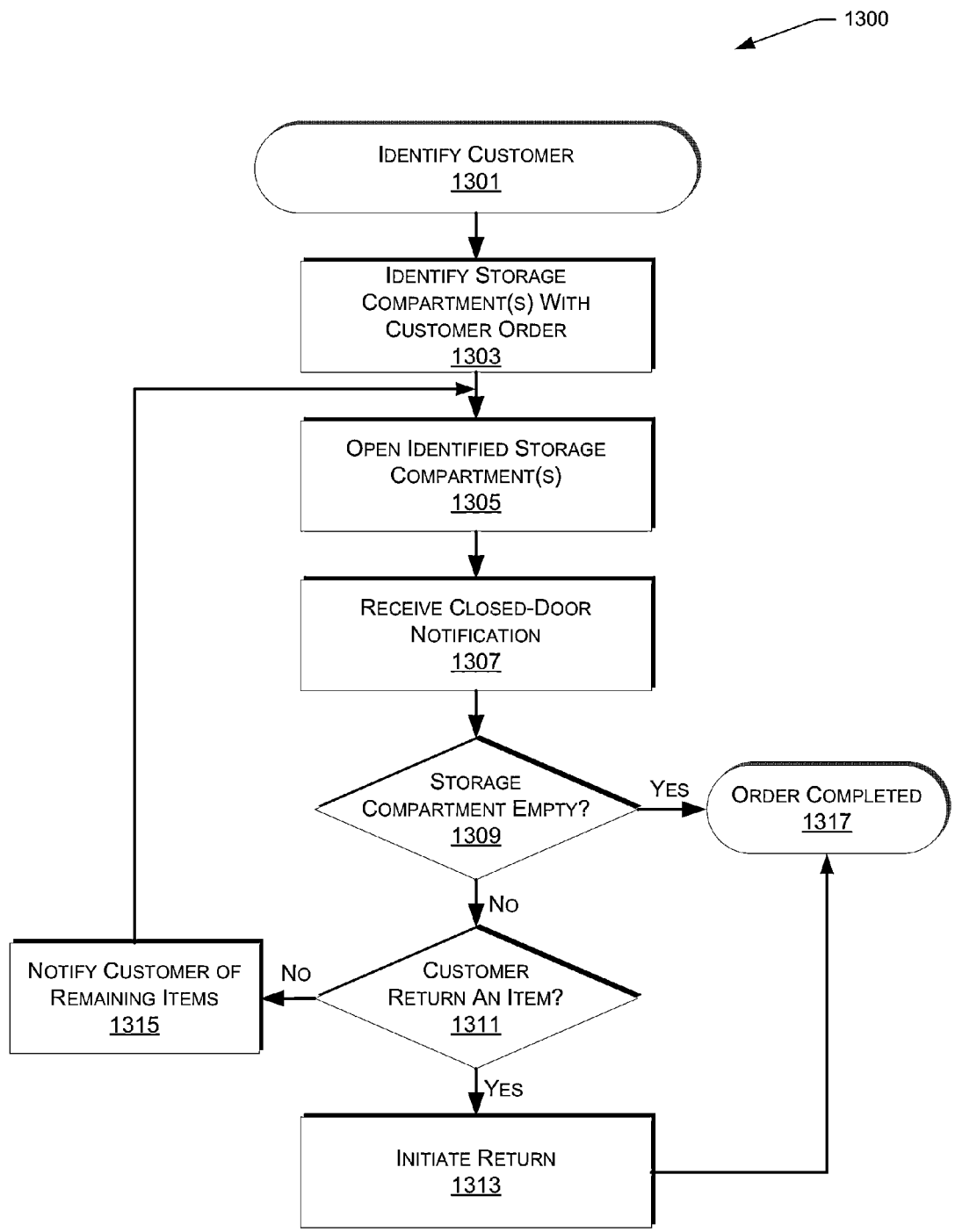
FIG. 13 is a flow diagram illustrating an example process for providing an order to a customer at a pickup location.

As discussed above in FIGS. 7-9, a customer may be notified when all items of an order, or subset of an order, have been placed in a storage compartments) at the pickup location and are available for retrieval. FIG. 13 is a flow diagram illustrating an example process 1300 for providing an order to a customer at a pickup location. When a customer arrives at the pickup location to retrieve a stored order, they are identified, as in 1301. For example, a customer may input a unique code into the numeric keypad 217 of the control station 201 that was provided to the customer by the process 700 when the customer was messaged that the order has been delivered to the pickup location and is available for pickup. In other implementations, the customer may be identified by using the biometric scanner 219, by scanning a barcode included in the message using the barcode scanner 215, by providing an identifier unique to the customer, or through any other type of identification means.

Upon identification of the customer at the pickup location, the storage compartment(s) containing the customer's ordered items is identified, as in 1303. Upon identifying the storage compartment(s) associated with the customer's order, the storage compartment(s) is opened, as in 1305. As discussed previously, a storage compartment may be opened by the command component of the control station 201 issuing an open storage compartment instruction to the storage compartment management component of a corresponding storage compartment module 203, 205, 207, 209 identifying the storage compartment of the storage compartment module that is to be opened. The storage compartment management component, upon receipt of an open storage compartment instruction, may cause the lock of the storage compartment to disengage thereby allowing the door to open.

Once an associated storage compartment(s) has been opened, the customer may retrieve the ordered items. As the customer is retrieving the ordered items from the open storage compartment(s), the process 1300 may also actively monitor the opened storage compartment to confirm retrieval of the ordered items. For example, an image capture device 273 included within the open storage compartment may be used to visually monitor and optionally record video of the ordered items being removed from the open storage compartment. In addition or as an alternative thereto, the presence detection sensor 271 and/or motion sensor 272 may be used to detect the presence or absence of objects within the storage compartment and/or the motion of retrieving an object from the opened storage compartment. Once the ordered items have been retrieved from the open storage compartment(s), the storage compartment door(s) is closed and the process receives a closed-door notification, as in 1307.

Upon receiving a closed-door notification, the process 1300 may determine whether the storage compartment being closed is empty, as in 1309. For example, if the image capture device 273 within the storage compartment had been activated, video or images captured by the image capture device 273 may be reviewed or analyzed to confirm whether any items remain within the storage compartment. In addition or as an alternative thereto, the presence detection sensor 271 and/or motion sensor 272 within the storage compartment may be queried to determine whether items remain in the storage compartment. If it is determined that the storage compartment is not empty, a determination is made as to whether an item is being returned, as in 1311.

In some implementations, the pickup location may support immediate return of items ordered and retrieved. For example, if a customer orders two pairs of shoes, each pair in different sizes, upon receipt of the ordered items the customer may select which pair they want to keep and which pair they want to return. The unwanted item may be returned by simply leaving it in the storage compartment or by manually requesting to return the item. In instances where items are simply left the storage compartment, the control station 201, through use of the image capture device 273 included within the storage compartment may capture an image of the remaining item and attempt to identify or otherwise determined what item has been left in the storage compartment. For example, image processing may be utilized to identify a barcode or other identifying indicia on the item left in the storage compartment. In other implementations, the customer may interact with user interface 211 to retrieve information about the customer's order and select or otherwise identify the item or items that have been left in the storage compartment to be returned. In some implementations, the types of items to be returned may be limited by category. For example, while shoes may be a category of items available for return, other categories, such as underwear, may not be available for immediate return.

If it is determined that a customer has intentionally left an item in the storage compartment and the item is to be returned, upon identification of the item, the process 1300 may initiate return of the item to the materials handling facility, as in 1313. A returned item may be scheduled for retrieval by a carrier or other individual from the storage compartment and returned to the materials handling facility. In other implementations, the item may remain in the storage compartment and be reallocated to another customer's order for that item. In such an instance, the customer to which the returned item is reallocated may have selected the pickup location as the delivery location for the item or may have selected another location for delivery. If the pickup location for the new order has been selected as the delivery destination, the storage compartment containing the returned item may be associated with the new order and a message provided to the customer placing the new order that the item is available for pickup. However, if the item has been allocated to a new order with a different delivery destination, the storage compartment may be treated as a storage compartment containing a transfer container such that the item is retrieved by a carrier for delivery.

Returning to decision block 1311, if it is determined that the customer has not initiated a return of an item, the customer may be notified that remaining items are still in the storage compartment, as in 1315. In this implementation, the storage compartment door may not be closed or may be reopened so that the customer, upon receiving the notification, may retrieve the items that remain in the storage compartment. However, the process 1300 may also determine whether the customer is still within the vicinity of the pickup location before reopening the storage compartment. If it is determined the customer has left the pickup location, the storage compartment door may remain closed and a new message sent to the customer notifying the customer that one or more items have been left in the storage compartment and that those items are available for pickup. This may include providing the customer with a new identification code or informing the customer that they can identify themselves using the identification code previously utilized for the order.

Finally, if it is determined at decision block 1309 that the storage compartment is empty or if a return for the remaining item has been initiated at block 1313, the process 1300 completes, as in 1317.

Figure 14:
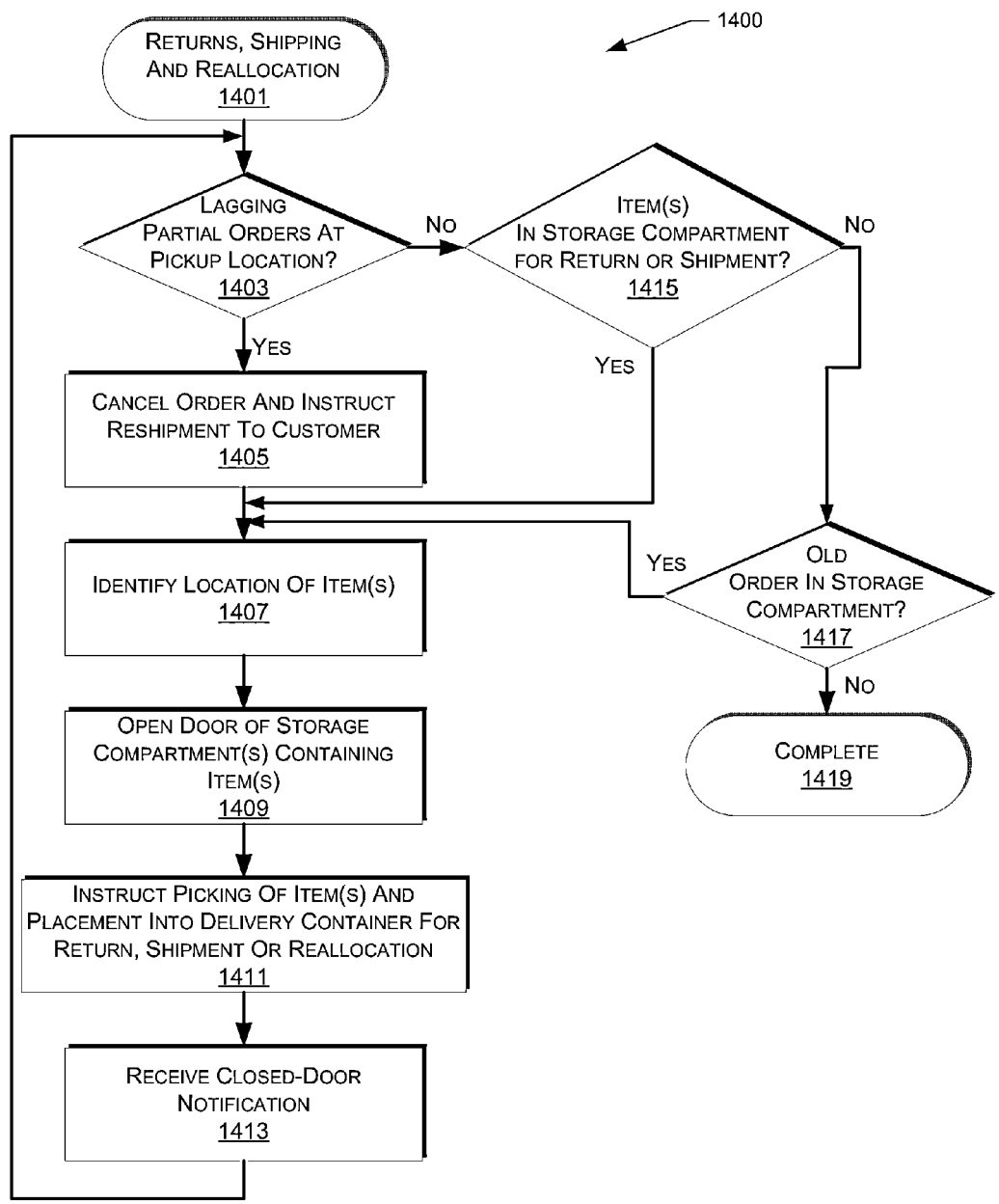
FIG. 14 is a flow diagram illustrating an example process for processing returns, reallocation and items provided for shipment at a pickup location.

FIG. 14 is a flow diagram illustrating an example process 1400 for processing returns, reallocation and items provided for shipment at a pickup location. As noted above, customers may return items to the pickup location at the time the items are picked up by the customer. In other implementations a customer may utilize the pickup location to initiate a return of previously ordered items. In some examples, the customer may initiate the return on an e-commerce website or other purchasing location and the item to be returned may be packed in a shipping package and labeled for return to the seller. In other examples, the customer may initiate the return by interacting with the user interface 211 of the control station 201 to identify the item, obtain return information, and prepare the item for return via the pickup location. In a similar fashion, a user may utilize the pickup location to ship items to other locations. For example, a user may interact with the user interface 211 and obtain shipping materials, labels, provide destination information and/or pay for shipping of items that may then be placed into a storage compartment of the pickup location for shipping. The process 1400 may begin upon initiation of a request to retrieve returns, items for shipping and/or reallocation of items currently contained in the pickup location, as in 1401. This process may be performed by any individual, such as the individuals performing any of the above processes. For example, upon completion of delivery of items to a pickup location, as described above with respect to FIGS. 7-9, the individual delivering those items may initiate the returns, shipping and reallocation process 1400. In an alternative implementation, the returns, shipping and reallocation process may automatically initiate upon completion of delivery container receive at the pickup location.

The process 1400 determines whether there any lagging partial orders at the pickup location, as in 1403. A lagging partial order may be, for example, an order for which one or more, but not all of the items have been delivered to the pickup location and the delivery date provided to the customer is approaching. In such an example, if it is determined that all of the items for the order may not arrive at the pickup location in time for satisfying the delivery date promised to the customer, the order may be identified as a lagging partial order. If it is determined that there is a lagging partial order at the pickup location, the order may be canceled and a request may be sent to the materials handling facility to reship the items directly to the customer in a manner that will satisfy the delivery date provided to the customer, as in 1405. In an alternative implementation, rather than canceling the entire order, the order may be segmented into multiple shipment sets, one shipment set including the items currently at the pickup location and another shipment set including the items that have not yet arrived at the pickup location. By splitting the order into multiple shipment sets, the items available at the pickup location may be sorted and placed into a storage compartment and made available for pickup by the customer. The other shipment set that contains the items not yet arrived at the pickup location may be canceled and those items reshipped from a materials handling facility in a manner that will result in the items being delivered to the customer by the promised delivery date.

Continuing with the above example of canceling the entire order, the location of the items that have arrived at the pickup location may be identified, as in 1407. Upon identifying the storage compartment(s) containing the items of the lagging order, the storage compartment is opened, as in 1409. As discussed previously, a storage compartment may be opened by the command component of the control station 201 issuing an open storage compartment instruction to the storage compartment management component of a corresponding storage compartment module 203, 205, 207, 209 identifying the storage compartment of that storage compartment module that is to be opened. The storage compartment management component, upon receipt of an open storage compartment instruction, may cause the locking mechanism of the identified storage compartment to disengage, thereby allowing the storage compartment door to open.

Once an associated storage compartment has been opened, instructions for retrieving the items from the open storage compartment and placing those items into a delivery container for return or reallocation are provided, as in 1411. For example, instructions may be provided via the display 213 of the control station 201, wirelessly transmitted to a handheld device utilized by the individual, or through any other communication channel. In addition to issuing instructions for moving the items from the open storage compartment to a delivery container for return or reallocation, the process may also include actively monitoring the opened storage compartment to confirm that the items are removed from the open storage compartment. For example, an image capture device 273 included within the open storage compartment may be used to visually monitor and optionally record video of the items being removed from the storage compartment. In addition or as an alternative thereto, the presence detection sensor 271 and/or motion sensor 272 may be used to detect the presence or absence of objects within the storage compartment and/or the motion of removing an object from the storage compartment. Once the items have been removed from the storage compartment, the storage compartment door is closed and the process receives a closed-door notification, as in 1413.

Upon receipt of a closed-door notification and confirmation that the items have been removed from the storage compartment, the process returns to decision block 1403 to determine if there are additional lagging partial orders at the pickup location. If it is determined that there are no additional lagging partial orders at the pickup location, a determination is made as to whether there are items at the pickup location for return or for shipment, as in 1415. As discussed above, ordered items may be immediately returned by leaving them in the storage compartment at the pickup location or otherwise identifying the items that are to be returned. Also, the pickup location may be used to process and return orders that have been initiated through other means, such as an order return process initiated on an e-commerce website. In addition to items that have been affirmatively returned by a customer, items that were pre-stored in storage compartments of the pickup location for subsequent allocation to an order may be reviewed to see if they should remain at the pickup location or be returned to a materials handling facility. For example, if the items were previously high-volume items pre-stored in the storage compartments but the demand for the items has diminished, the pre-stored items may be designated for return to a materials handling facility.

Likewise, the pickup location may be used to ship items to other destinations. For example, a user may interact with the user interface 211 of the control station 201 to pay shipping costs for a shipping package, print labels for a shipping package, and place that shipping package in a storage compartment of the pickup location for shipment to another destination. If it is determined that there are items in a storage compartment for return or shipment, the process 1400 returns to block 1407, identifies the location of the items, and continues. Likewise, the pickup location may also act as an exchange location for items that do not need to be shipped. For example, if an item is to be delivered from customer A to customer B, customer A may place the item in a storage compartment of the pickup location and customer B may be messaged that the item is available for pickup at the pickup location. Customer B may then arrive at the pickup location, be identified and retrieve the item.

Returning to the example process 1400, if it is determined that there are no items at the pickup location for return or shipment, a determination is made as to whether there is a completed but old order in one or more of the storage compartments at the pickup location, as in 1417. In some implementations, the pickup location may only make orders available to a customer for pickup for a defined period of time, such as three days. If the customer does not pick up the order within the designated time period, the process 1400 may identify the order, cancel the order, and initiate return of the order. If it is determined that there is an old order in one or more of the storage compartments at the pickup location, the process 1400 returns to block 1407, identifies the location of those items and continues. However if it is determined that there are no lagging orders, no items for return or shipment, and no old orders, the process completes, as in 1419.

FIG. 15 is a block diagram illustrating an example computer system configured to implement one or more of the operations performed at a pickup location, as described herein. In the illustrated implementation, a computer system 1500 includes one or more processors 1510A, 1510B through 1510N, coupled to a non-transitory computer readable storage medium 1520 via an input/output (I/O) interface 1530. The computer system 1500 further includes a network interface 1540 coupled to an I/O interface 1530, and one or more input/output devices 1550. In some implementations, it is contemplated that components of a pickup location (e.g., command component, storage compartment management component, control station) may be implemented using a single instance of the computer system 1500, while in other implementations, multiple such systems or multiple nodes making up the computer system 1500 may be configured to host different portions, components or instances of a pickup location. For example, in one implementation, some data sources or services (e.g., capturing images or video within a storage compartment, detecting particulates, computing available space within a storage compartment) may be implemented via one or more nodes of the computer system 1500 that are distinct from those nodes implementing other data sources or services (e.g., providing commands to open a storage compartment, providing messaging to customers, users or carriers). In some implementations, a given node may implement the functionality of more than one component of a pickup location.

In various implementations, the computer system 1500 may be a uniprocessor system including one processor 1510A, or a multiprocessor system including several processors 1510A-1510N (e.g., two, four, eight, or another suitable number). The processors 1510A-1510N may be any suitable processor capable of executing instructions. For example, in various implementations the processors 1510A-1510N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1510A-1510N may commonly, but not necessarily, implement the same ISA.

The non-transitory computer readable storage medium 1520 may be configured to store executable instructions and/or data accessible by the one or more processors 1510A-1510N. In various implementations, the non-transitory computer readable storage medium 1520 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1520 as program instructions 1525 and data storage 1535, respectively. In other implementations, program instructions and/or data may be received, sent or stored upon different types of computer-accessible media, such as non-transitory media, or on similar media separate from the non-transitory computer readable storage medium 1520 or the computer system 1500. Generally speaking, a non-transitory, computer readable storage medium may include storage media or memory media such as magnetic or optical media, e.g., disk or CD/DVD-ROM coupled to the computer system 1500 via the I/O interface 1530. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1540.

In one implementation, the I/O interface 1530 may be configured to coordinate I/O traffic between the processors 1510A-1510N, the non-transitory computer readable storage medium 1520, and any peripheral devices in the device, such as the computer systems of the storage compartment modules, the network interface 1540 or other peripheral interfaces, such as input/output devices 1550. In some implementations, the I/O interface 1530 may perform any necessary protocol, timing or other data transformations to convert data signals from one component (e.g., non-transitory computer readable storage medium 1520) into a format suitable for use by another component (e.g., processors 1510A-1510N). In some implementations, the I/O interface 1530 may include support for devices attached through various types of peripheral buses, such as a variant of the Peripheral Component Interconnect (PCI) bus standard or the Universal Serial Bus (USB) standard, for example. In some implementations, the function of the I/O interface 1530 may be split into two or more separate components, such as a north bridge and a south bridge, for example. Also, in some implementations, some or all of the functionality of the I/O interface 1530, such as an interface to the non-transitory computer readable storage medium 1520, may be incorporated directly into the processors 1510A-1510N.

The network interface 1540 may be configured to allow data to be exchanged between the computer system 1500 and other devices attached to a network, such as other computer systems, or between nodes of the computer system 1500. For example, the network interface 1540 may utilize the wireless antennas 241, 243, 231, 245, 247 to allow interaction and interface between the command component of the control station 201 and the storage compartment management component of each connected storage compartment module 203, 205, 207, 209. In various implementations, the network interface 1540 may support communication via wired or wireless general data networks, such as any suitable type of Ethernet network. For example, the network interface 1540 may support communication via telecommunications/telephony networks such as analog voice networks or digital fiber communications networks, via storage area networks such as Fibre Channel SANs, or via any other suitable type of network and/or protocol.

Input/output devices 1550 may, in some implementations, include one or more display terminals, keyboards, keypads, touchpads, scanning devices, voice or optical recognition devices, or any other devices suitable for entering or retrieving data by one or more computer systems 1500. Multiple input/output devices 1550, such as the user interface 211 and the components described therein, may be present in the computer system 1500 or may be distributed on various nodes of the computer system 1500. In some implementations, similar input/output devices may be separate from the computer system 1500 and may interact with one or more nodes of the computer system 1500 through a wired or wireless connection, such as over the network interface 1540. For example, the computer systems of the storage compartment modules 203, 205, 207, 209 and/or the locking mechanisms of those storage compartment modules may communicate with the computer system 1500 as input/output devices 1550 over wired or wireless network interface 1540.

As shown in FIG. 15, the memory 1520 may include program instructions 1525 which may be configured to implement a pickup location and data storage 1535, which may comprise various tables, databases and/or other data structures accessible by the program instructions 1525. In one implementation, the program instructions 1525 may include various software modules configured to implement a particulate scanner, user interface 211, security, locking and unlocking of storage compartments, and management of the pickup location. The data storage 1535 may include various data stores for maintaining one or more storage compartment module configurations, data representing presence or absence of items contained in various storage compartments, access information for various storage compartments and/or other item parameter values. The data storage 1535 may also include one or more data stores for maintaining data representing item returns, hold orders, partial orders, transfer container locations, and other information utilized by the pickup location.

In various implementations, the parameter values and other data illustrated herein as being included in one or more data stores may be combined with other information not described or may be partitioned differently into more, fewer, or different data structures. In some implementations, data stores used in a pickup location, or in components or portions thereof, may be physically located in one memory or may be distributed among two or more memories. These memories may be part of a single computer system or they may be distributed among two or more computer systems, such as two computer systems connected by a wired or wireless local area network, or through the Internet, in different implementations. Similarly, in other implementations, different software modules and data stores may make up a pickup location system and/or any of the various components thereof described herein.

Those skilled in the art will appreciate that the computing system 1500 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The computing system 1500 may also be connected to other devices that are not illustrated, or instead may operate as a stand-alone system. In addition, the functionality provided by the illustrated components may in some implementations be combined in fewer components or distributed in additional components. Similarly, in some implementations the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated computing system via inter-computer communication. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from computer system 1500 may be transmitted to computer system 1500 via transmission media or signals such as electrical, electromagnetic, or digital signals, conveyed via a communication medium such as a network and/or a wireless link. Various implementations may further include receiving, sending or storing instructions and/or data implemented in accordance with the foregoing description upon a computer-accessible medium. Accordingly, the techniques described herein may be practiced with other computer system configurations.

Those skilled in the art will appreciate that in some implementations the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method comprising:
   under control of one or more computing devices configured with executable instructions, receiving a request for a first item of a first order associated with a customer;
   identifying a pickup location to which the first item is to be delivered and stored for retrieval;
   in response to receiving the request for the first item and identifying the pickup location, identifying a delivery container including at least one item of a second order to be delivered to the pickup location, the second order being associated with a different customer than the customer associated with the first order;
   causing the first item of the first order to be picked from inventory at a materials handling facility and placed in the delivery container at the materials handling facility;
   initiating transport of the delivery container from the materials handling facility to the pickup location;
   identifying, at least in part by a control station of the pickup location, the delivery container;
   selectively disengaging, at least in part by the control station, at least one locking mechanism corresponding to at least one compartment to provide access to at least one interior space of the at least one compartment;
   subsequent to identifying the delivery container, causing the control station of the pickup location to generate instructions to move the first item of the first order and the at least one item of the second order from the delivery container into the at least one interior space of the at least one compartment of the pickup location such that the first item of the first order and the at least one item of the second order are stored separately at the pickup location; and
   transmitting information to an electronic device associated with the customer, the information indicating that at least the first item is available for pickup at the pickup location.

2. The method as recited in claim 1, further comprising:
   prior to receiving the request for the first item of the first order, causing the at least one item of the second order to be transferred from inventory at the materials handling facility to the delivery container at the materials handling facility without packing the at least one item of the second order in a shipping package.

3. The method as recited in claim 1, further comprising:
   receiving at a second materials handling facility a request for a second item of the first order;
   causing the second item of the first order to be picked from inventory at the second materials handling facility and placed in a second delivery container;
   initiating transport of the second delivery container from the second materials handling facility to the pickup location; and
   generating further instructions to place the second item of the first order into the at least one compartment of the pickup location such that the first item of the first order and the second item of the first order are stored together, wherein transmitting information to the electronic device associated with the customer occurs subsequent to the further instructions being generated.

4. One or more non-transitory computer readable media storing computer-executable instructions that, when executed on one or more processors, cause the one or more processors to perform acts comprising:
   identifying, at least in part with a control station of a pickup location, a first delivery container at the pickup location, the first delivery container including a first item;
   identifying, at least in part with the control station, a second delivery container at the pickup location, the second delivery container including a second item;
   identifying a storage compartment that is at the pickup location;
   selectively disengaging, at least in part with the control station, a locking mechanism of the storage compartment to provide access to an interior space of the storage compartment; and
   subsequent to identifying at least one of the first delivery container or the second delivery container, generating, at least in part with the control station of the pickup location, instructions to place at least one of the first item or the second item in the storage compartment,
   wherein the storage compartment is identified prior to the instructions being generated, and wherein the storage compartment is identified at least in part by selecting the storage compartment from a plurality of storage compartments that are at the pickup location.

5. The one or more non-transitory computer readable media as recited in claim 4, the acts further comprising:
   sending an indication to an electronic device associated with a customer that the first item and the second item are available for pickup at the pickup location.

6. The one or more non-transitory computer readable media as recited in claim 4, wherein the second delivery container is stored in a second storage compartment at the pickup location.

7. The one or more non-transitory computer readable media as recited in claim 4, wherein the first delivery container further includes a plurality of items.

8. The one or more non-transitory computer readable media as recited in claim 4, wherein a third item is to be placed in the storage compartment along with the first item and the second item.

9. The one or more non-transitory computer readable media as recited in claim 4, wherein the first delivery container is received at the pickup location during a first time interval and the second delivery container is received at the pickup location during a second time interval.

10. The one or more non-transitory computer readable media as recited in claim 4, wherein the first delivery container is received from a first materials handling facility and the second delivery container is received from a second materials handling facility.

11. The one or more non-transitory computer readable media as recited in claim 4, wherein generating instructions to place at least one of the first item or the second item in the storage compartment includes:
    generating instructions to place the first delivery container and the second delivery container in the storage compartment.

12. The one or more non-transitory computer readable media as recited in claim 4, wherein generating instructions to place the at least one of the first item or the second item in the storage compartment further includes:

generating instructions to place the first item in the second delivery container and place the second delivery container that includes both the first item and the second item in the storage compartment.

13. The one or more non-transitory computer readable media as recited in claim 4, the acts further comprising:
identifying a third delivery container at the pickup location, the third delivery container including a third item; and
generating instructions to place the third item in the storage compartment.

14. The one or more computer non-transitory readable media as recited in claim 4, wherein identifying the second delivery container includes identifying a storage compartment at the pickup location that currently includes the second delivery container.

15. The one or more computer non-transitory readable media as recited in claim 4, wherein identifying the first delivery container at the pickup location includes scanning a barcode located on the first delivery container.

16. The method of claim 1, further comprising:
causing the first item to be picked from inventory at the materials handling facility and placed in the delivery container without packing the first item in a shipping package.

17. The method of claim 1, wherein identifying the pickup location includes:
selecting the pickup location from a plurality of pickup locations based on a size of one or more items in the first order and a space available at the pickup location.

18. The method of claim 17, further comprising:
identifying a pickup location prior to initiating transport of the delivery container from the materials handling facility.

19. The method of claim 1, further comprising:
transmitting a notification when the first item is retrieved from the pickup location.

20. The method of claim 1, wherein the generated instructions further include instructions to move:
the first item of the first order from the delivery container to a first compartment of the pickup location; and
the at least one item of the second order from the delivery container to a second storage compartment of the pickup location.

21. A method comprising:
receiving a request for a first item of a first order associated with a customer;
identifying, by an order planning system, a pickup location to which the first order is to be delivered;
subsequent to receiving the request for the first item and identifying the pickup location, identifying, at least in part by the order planning system, a delivery container that includes a second item of a second order to be delivered to the pickup location, wherein the second order is associated with a different customer than the customer associated with the first order;
picking the first item from inventory at a materials handling facility;
placing, at the materials handling facility, the first item of the first order in the delivery container with the second item of the second order;
transporting the delivery container from the materials handling facility to the pickup location;
identifying the delivery container at least in part with a control station of the pickup location;
selectively disengaging, at least in part by the control station, at least one locking mechanism corresponding to at least one compartment of the pickup location to provide access to at least one interior space of the at least one compartment;
subsequent to identifying the delivery container at least in part with the control station, causing the control station of the pickup location to generate instructions to move the first item of the first order and the second item of the second order from the delivery container to the at least one interior space corresponding to the at least one compartment of the pickup location such that the first item of the first order and the second item of the second order are stored separately at the pickup location; and
sending, to an electronic device associated with the customer, information indicating that the first item is ready for pickup.

22. The method of claim 1, further comprising:
generating instructions to transfer, at a first materials handling facility, at least the first item from an inventory to the first delivery container without packing the first item in a shipping package.

23. The method of claim 1, wherein the generated instructions are to move the first item of the first order and the at least one item of the second order from the delivery container into the at least one interior space of the at least one compartment of the pickup location.

* * * * *